United States Patent
Fröhlich et al.

[11] Patent Number: 5,888,621
[45] Date of Patent: Mar. 30, 1999

[54] WEB-LIKE ELEMENT AND CONNECTING ARRANGEMENT BETWEEN TWO WEB-LIKE ELEMENTS

[76] Inventors: Wolfgang Fröhlich; Ursula Fröhlich-Rössler, both of Thalham 13, A5202, Neumarkt am Wallersee, Austria

[21] Appl. No.: 700,494
[22] PCT Filed: Mar. 2, 1995
[86] PCT No.: PCT/AT95/00044
   § 371 Date: Aug. 28, 1996
   § 102(e) Date: Aug. 28, 1996
[87] PCT Pub. No.: WO95/23739
   PCT Pub. Date: Sep. 8, 1995

[30] Foreign Application Priority Data

Mar. 3, 1994 [AT] Austria ......................................... 454/94
Aug. 30, 1994 [AT] Austria ......................................... 1664/94

[51] Int. Cl.⁶ ............................... B32B 3/28; B32B 31/00
[52] U.S. Cl. ........................... 428/182; 428/120; 428/136; 428/167; 428/184; 156/207; 156/250; 156/257; 156/259
[58] Field of Search ..................................... 428/167, 182, 428/120, 134, 136, 172, 184, 213; 156/205, 207, 211, 250, 257, 259

[56] References Cited

U.S. PATENT DOCUMENTS

| 3,058,869 | 10/1962 | Cohen et al. | 156/250 |
| 4,070,515 | 1/1978 | Smarook | 428/92 |
| 4,472,473 | 9/1984 | Davis et al. | 428/184 |
| 5,510,170 | 4/1996 | Moore | 428/184 |

FOREIGN PATENT DOCUMENTS

| 28 36 617 | 3/1980 | Germany . |
| 235 048 | 2/1985 | Germany . |
| WO 89/08201 | 9/1989 | WIPO . |

*Primary Examiner*—Donald Loney
*Attorney, Agent, or Firm*—Collard & Roe, P. C.

[57] ABSTRACT

The invention describes a web-like element (2;3) comprising an upper layer (5; 7) and a lower layer (6; 8) or an intermediate layer which are held apart from one another vertically by longitudinal ribs. At least the upper layer (5; 7) is formed from several strip-like webs (16–19; 20–24) with a rectangular cross section which run parallel to one another on the longitudinal ribs and lie with their flat sides in a common plane. The strip-like webs (16–19; 20–24) are arranged at right angles to the longitudinal axis or the longitudinal ribs and/or in longitudinal direction with equal spacing (14).

31 Claims, 13 Drawing Sheets

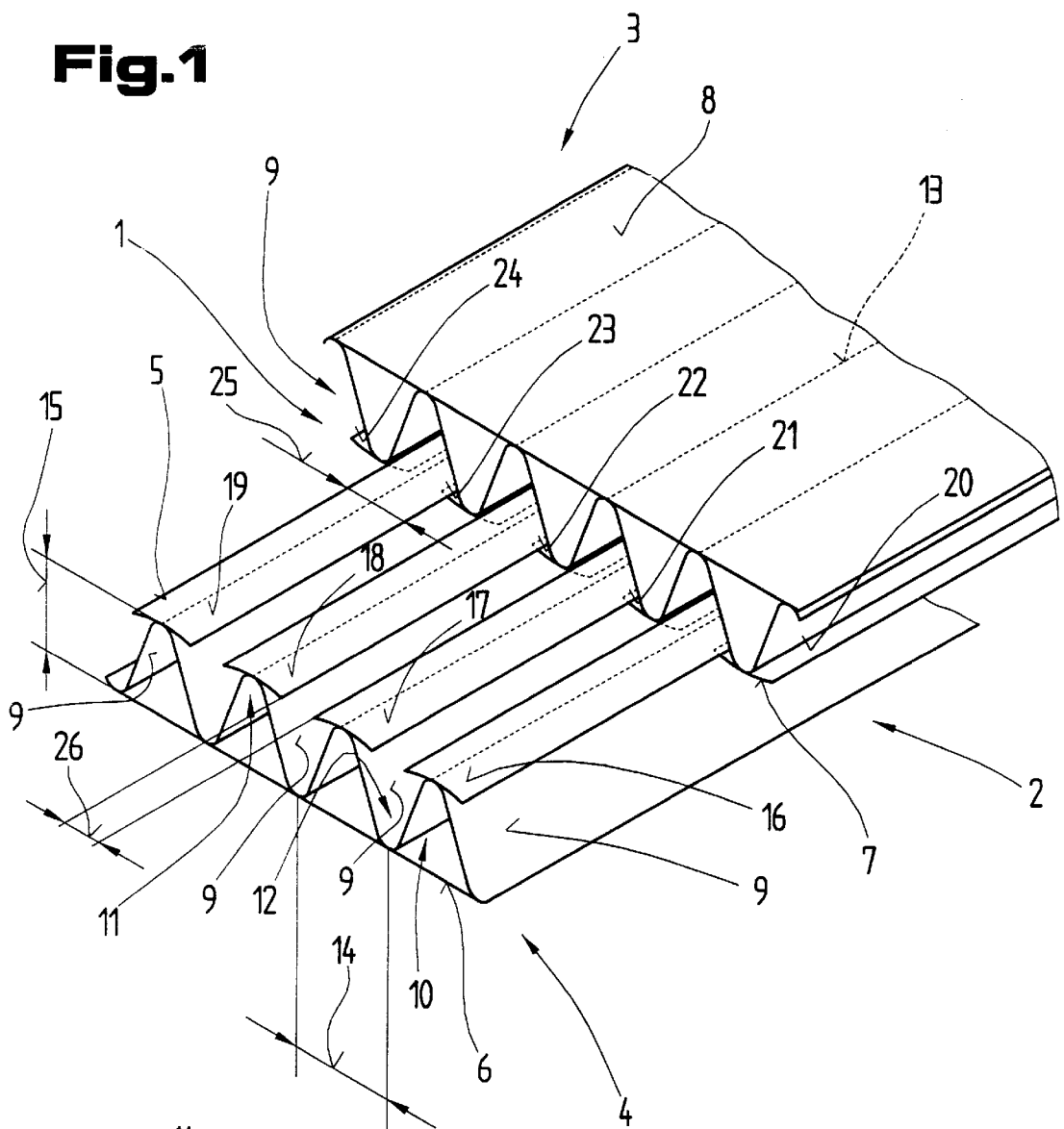
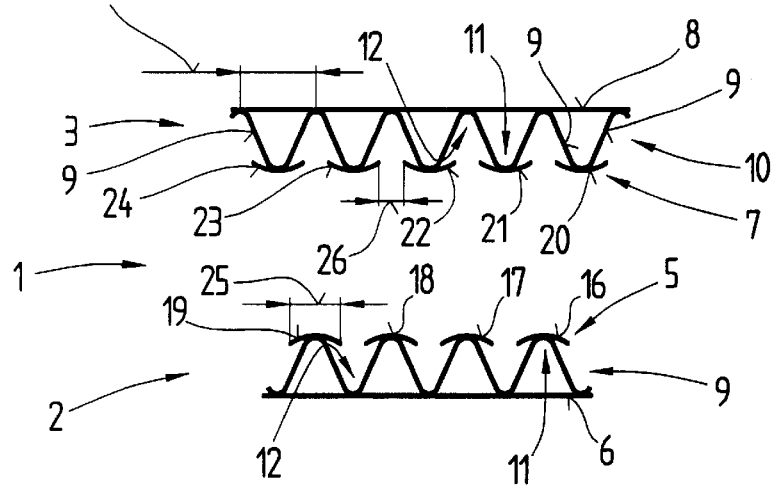

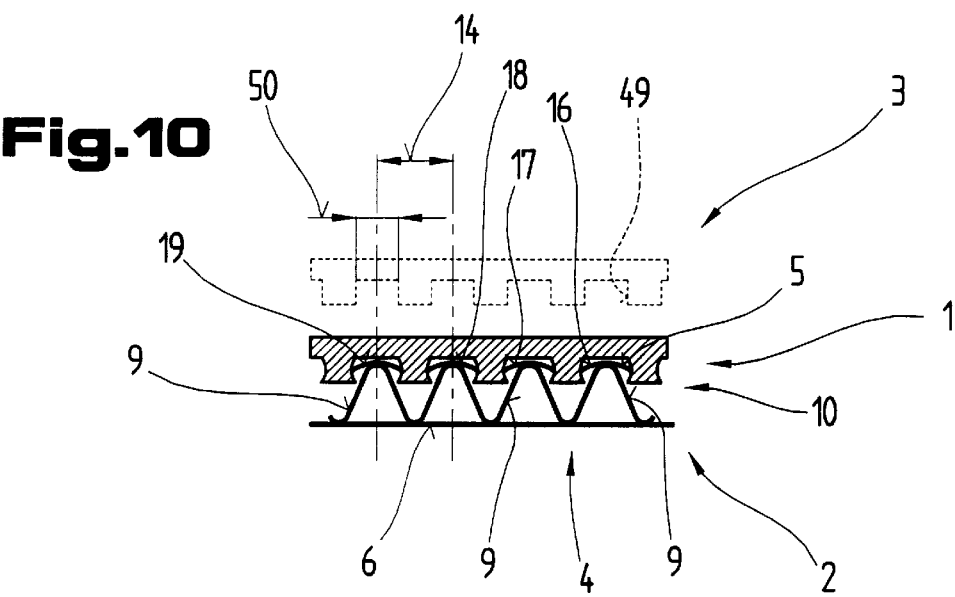
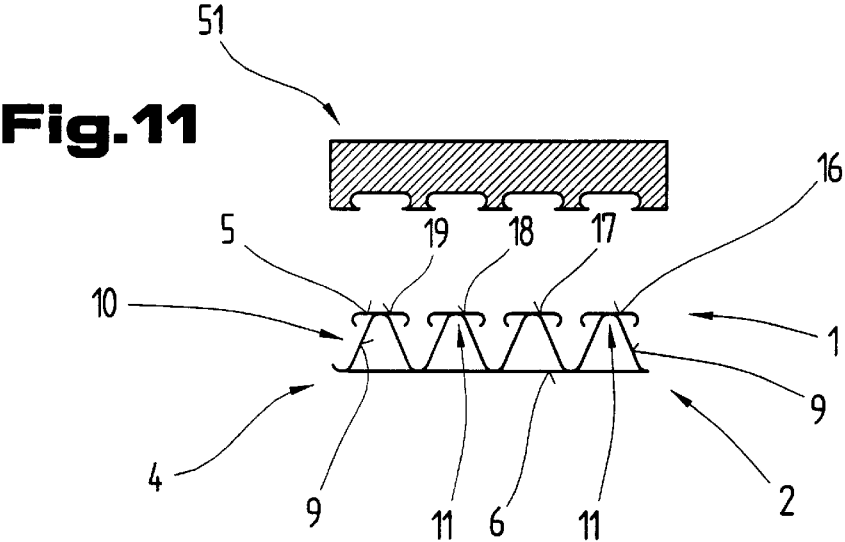
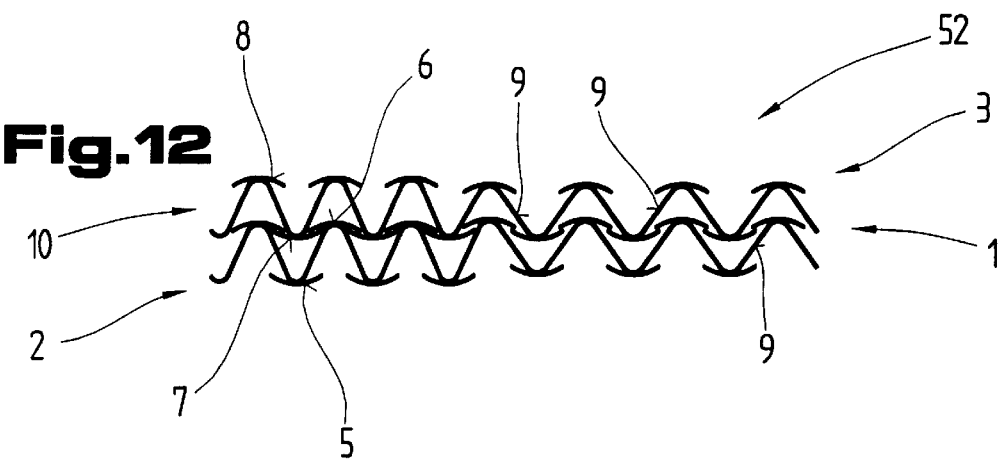

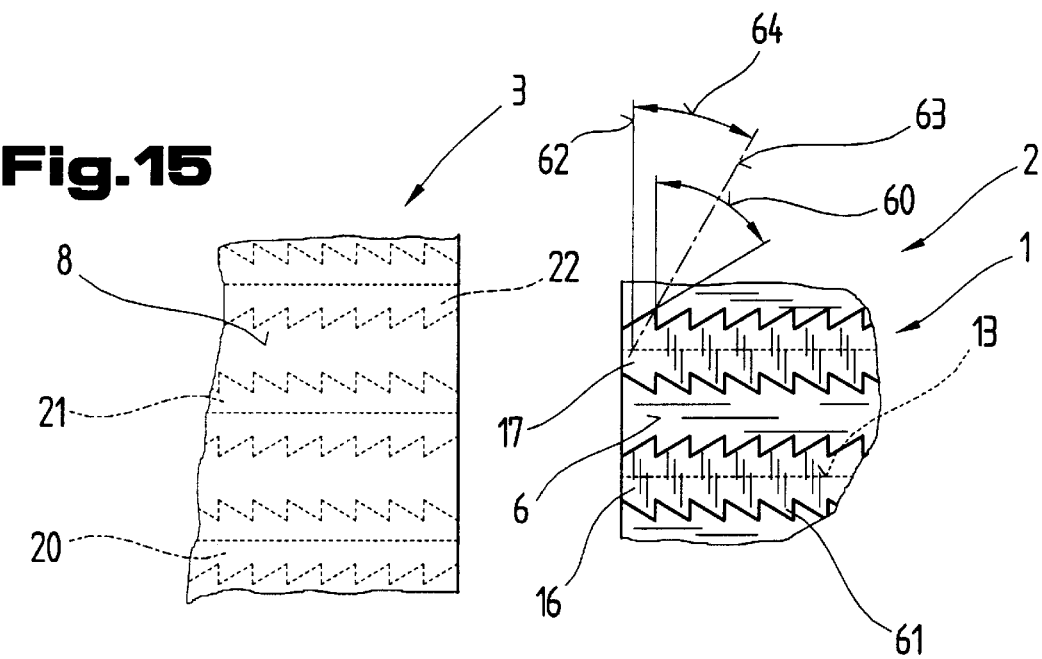
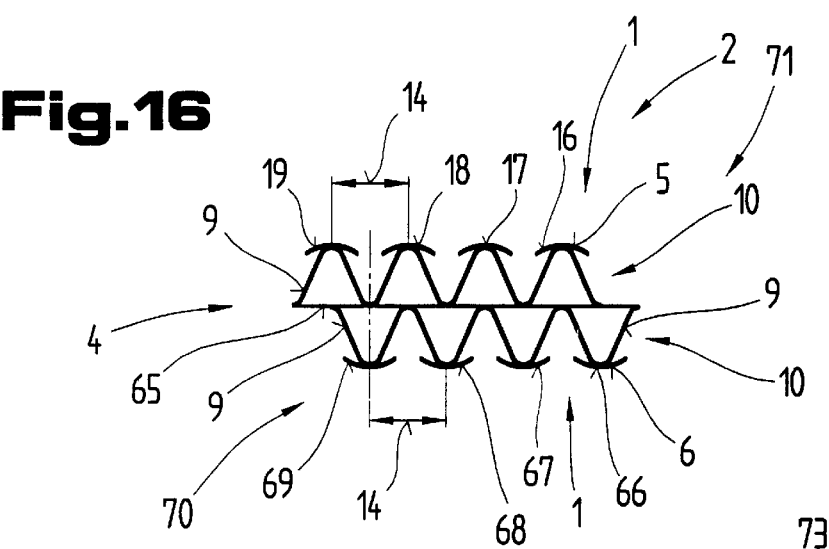
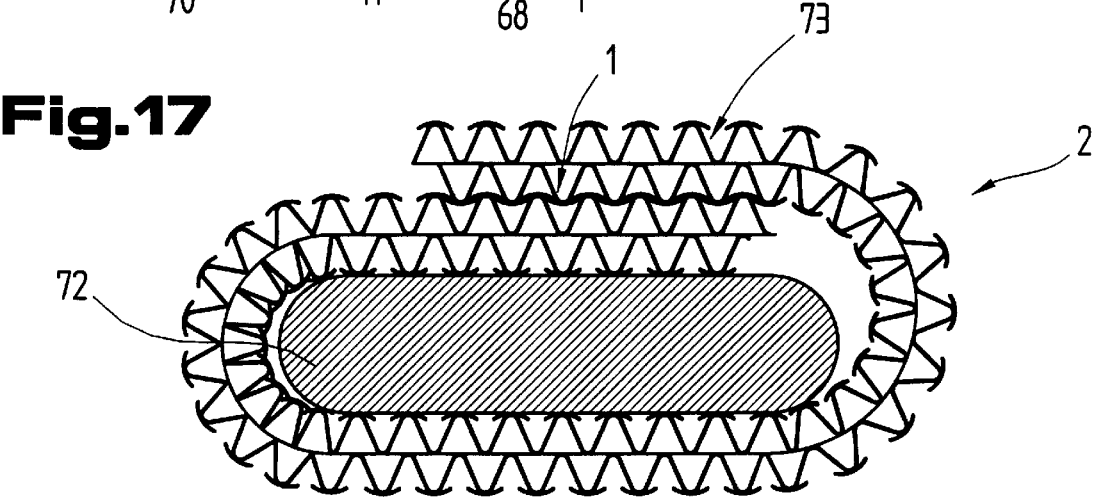

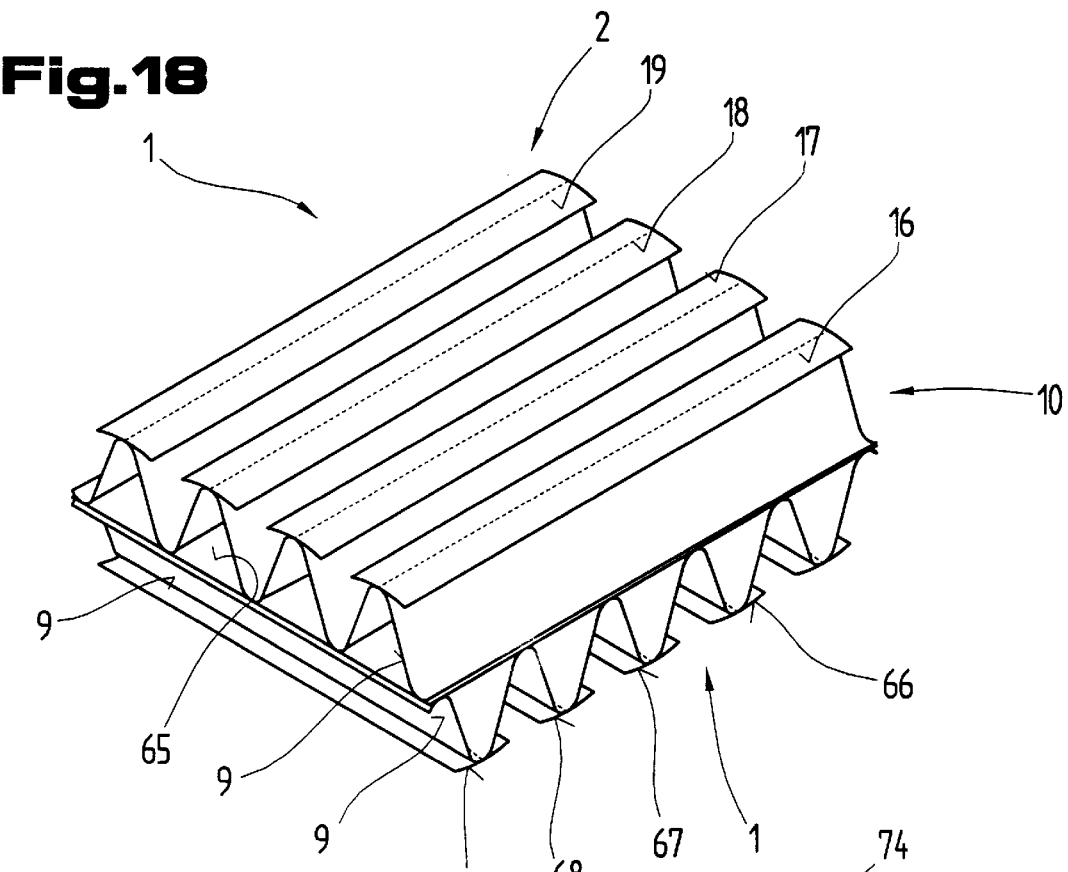
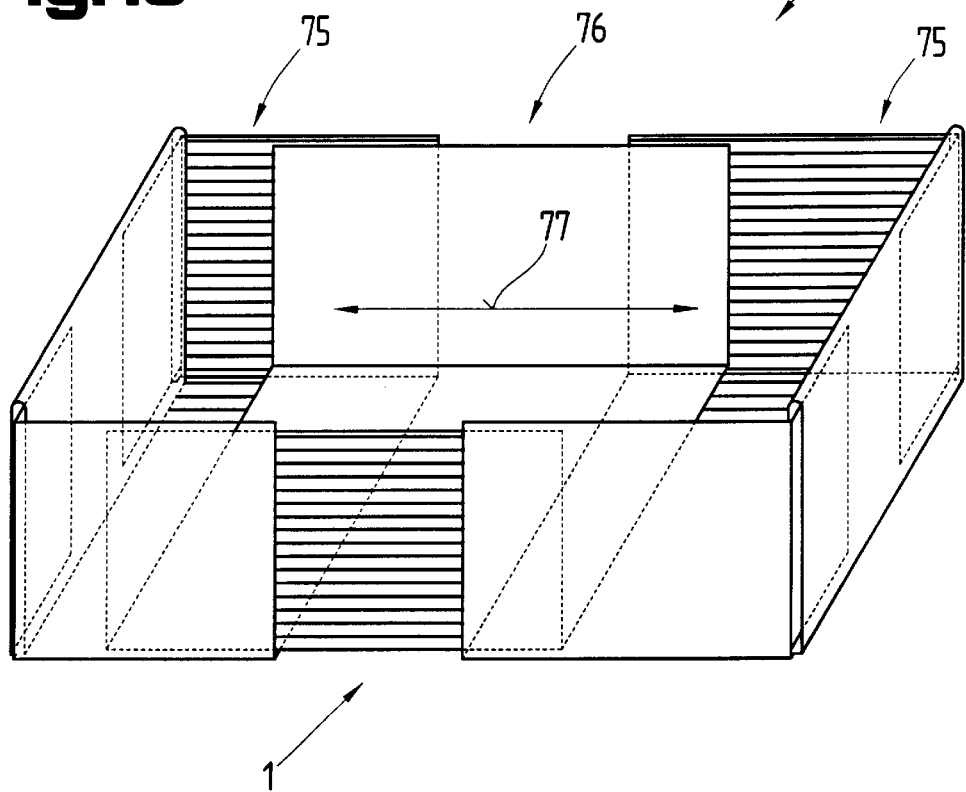

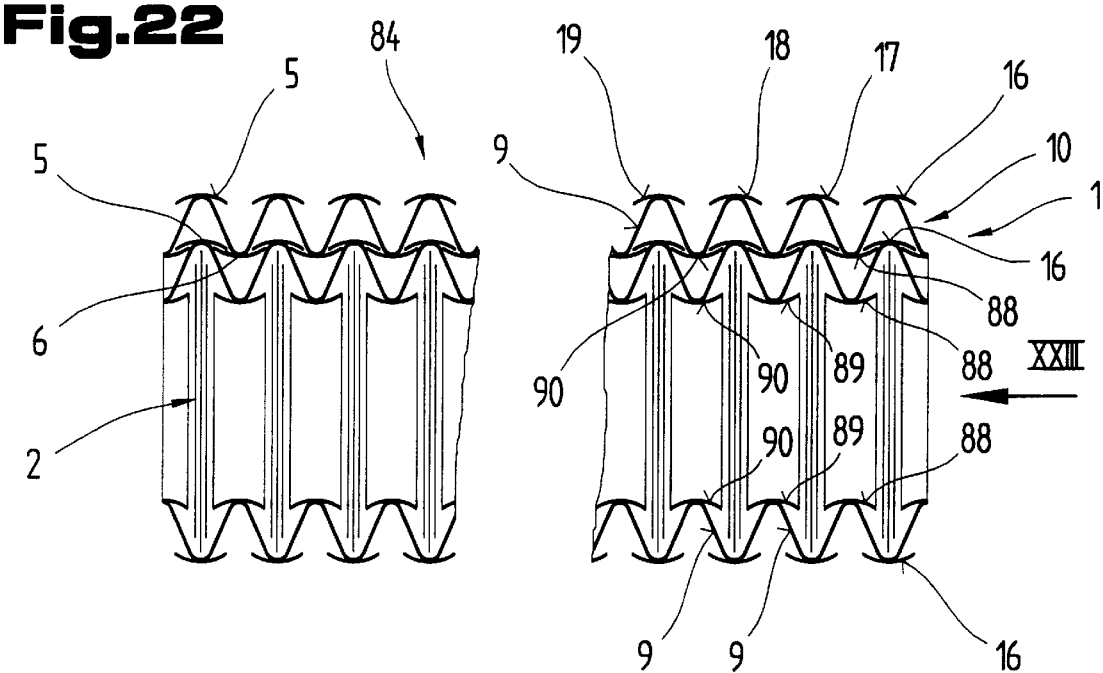
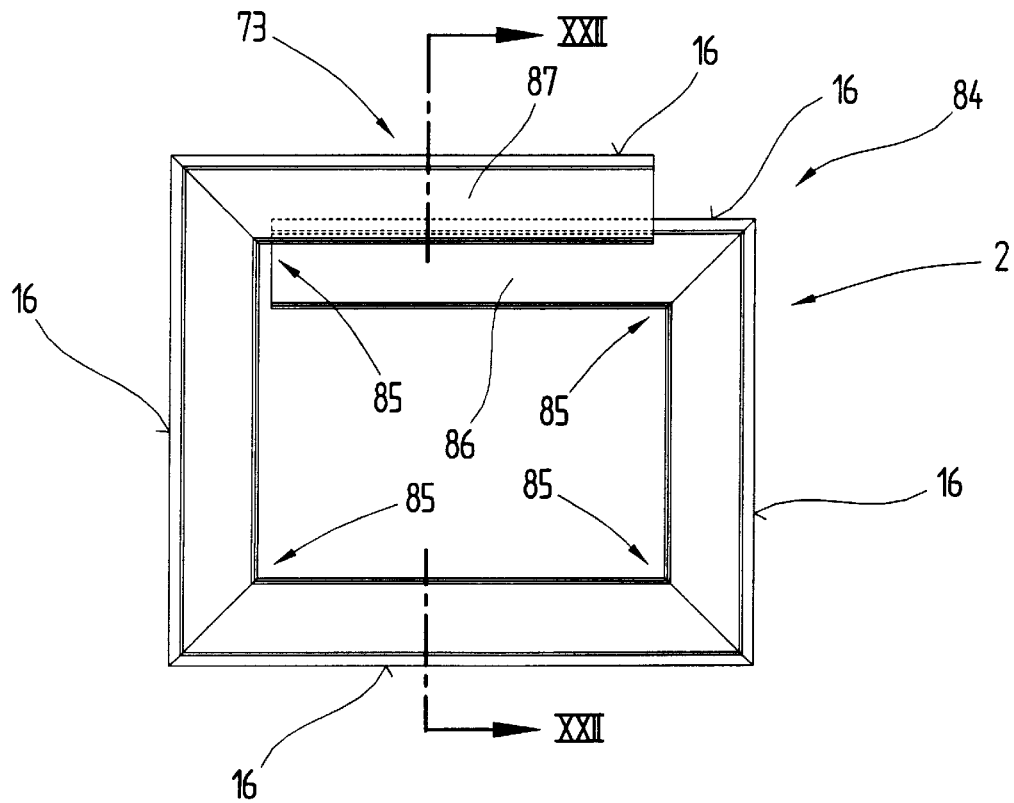

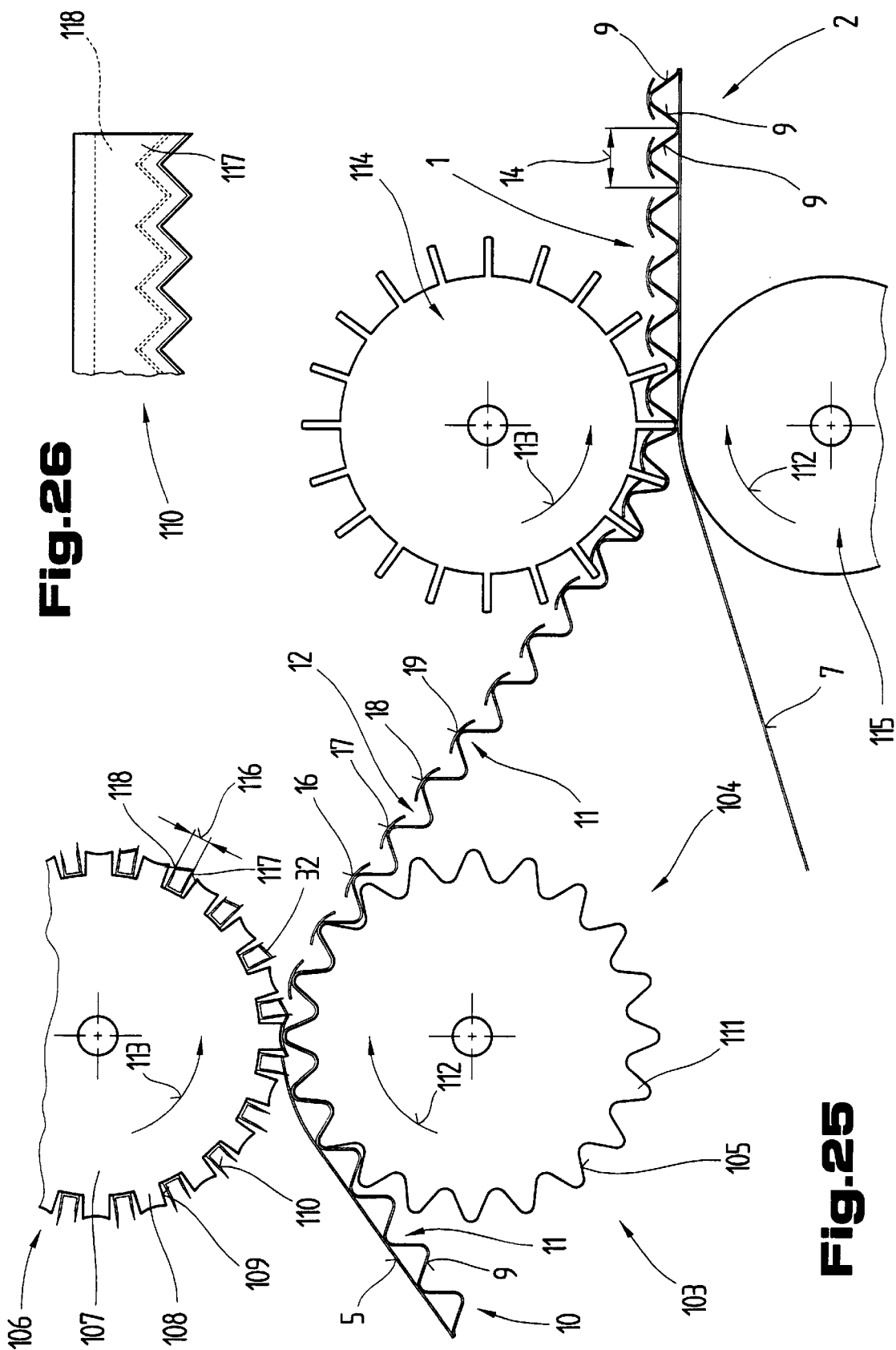

WEB-LIKE ELEMENT AND CONNECTING ARRANGEMENT BETWEEN TWO WEB-LIKE ELEMENTS

BACKGROUND OF THE INVENTION

1. Field of the Invention

The invention relates to a web-like element, a connecting arrangement between two web-like elements. and a method for producing such a web-like element.

2. Description of the Prior Art

An interlocking connection system with interlocking elements is known from WO-A1-89/08201 and the patent derived therefrom EP-B1-0 364 521, which comprises two connecting arrangements in strip form which are provided respectively on a so-called interlocking side with a plurality of at least partly elastically deformable interlocking elements. The individual interlocking elements of the connecting arrangement are here formed by ribs arranged vertically relative to a layer which are provided with elastically deformable lips which stand out on both sides of the ribs, in order thus to form narrowings of smaller dimension than the span of the lips of a given rib between the lips of two consecutive ribs. Here the two connecting arrangements are designed respectively in one piece and the connection of the individual connecting arrangements is made only by an elastic deformation of the elastic lips projecting over the ribs.

From U.S. Pat. No. 4,070,515 a web-like element is known which comprises an upper layer and a lower layer whereby the upper layer is formed from individual segments which are arranged and held spaced apart from one another by individual rib parts. Here the upper layer comprises several strip-like or panel-like web parts with a rectangular cross section which are arranged parallel to one another on the rib parts and lie with their flat sides in a common plane. At right angles to the longitudinal axis or the rib parts the web are arranged with equal spacing.

Furthermore, web-like elements are already known for example for light weight cores in skis—according to DD-A 235 048—in which a corrugated cardboard-type structure is used whereby an upper and a lower layer are connected by a corrugated intermediate layer and the two layers are held a prespecified distance apart by the longitudinal ribs of the corrugated layer. A similar panel made of corrugated cardboard is also known for example from DE-A 28 36 617.

SUMMARY OF THE INVENTION

The present invention is based on the problem of creating web-like elements which can be connected together detachably in a simple manner. In addition, a connecting system for such web-like elements is to be created, which permits rapid connection and non-destructive disconnection.

The problem of the invention is solved by the features of claim 1. The surprising advantage of this invention lies in the fact that a simple and inexpensive planar web-like element is created which can be made of various inexpensive materials, such as for example corrugated cardboard, plastic, elastic foamed plastic or similar substances and is designed so that it can always be connected in any position with other web-like elements, for example planar or three-dimensional components such as display boards in the field of advertising, for example in shop windows, on sales floors, stands at trade fairs or used as advertising displays or structural parts. Furthermore, it is also possible in an advantageous manner to create closable transport containers rapidly and simply without additional measures by means of the design of the web-like elements. The surprising effect of this solution lies in the fact that the connection with flat components or bodies such as packaging containers can be performed mechanically, that is without chemical bonding and is able to be disconnected again. By means of this design according to the invention it is possible in a surprising manner not only to achieve a rapid connection of different web-like elements but also a preferred repeated non-destructive disconnection and reconnection. Thus the web-like elements can be adjusted or moved to a different position in a simple manner and in this way it is possible to use web-like elements repeatedly and position them accurately after the connection thereof. Furthermore, this type of connection technology of the elements also permits a displacement of the latter in their interlocked position, whereby adjustment movements for closing or opening and the like are possible by means of this design of the web-like elements. In this way conventionally produced web-like elements, such as for example corrugated cardboard, can be used as a starting product for the web-like elements according to the invention.

By means of the design according to claim 4, a considerable reinforcement can be achieved whereby large-area self-supporting components can be created.

Preferred additional embodiments are described in the design according to claim 5, A further development according to claim 6 is also advantageous as thereby e.g. waste material can also be saved as the strips required for the connection can be applied directly onto the longitudinal ribs in prefabricated form.

An embodiment according to claim 7 is also possible in which on using one-piece sections of such web-like elements and folding them into closed containers the connection and securing in the assembled position can be performed by webs.

The connecting arrangement according to the invention is characterised by the features of the independent claims 24 and 25. By means of the simple provision that the webs project accordingly the extent of the projection over the longitudinal ribs and the selection of the corresponding rigidity and strength of the cardboard or paper or film, from which the webs are made, the holding strength and bearing strength of such a connecting arrangement can be adapted in a surprisingly simple manner to different conditions.

By means of the further development according to claim 26, flat overlying elements can be connected in a simple manner without being misaligned relative to one another.

By means of the elastic deformability according to claim 27, a frequent connection and disconnection of the connecting arrangement is made possible without destroying the latter.

A connection of elements made of different materials can be achieved by means of the features according to claim 28 and/or 29.

By means of the design of the webs or web parts according to claim 30, the holding force or interlocking force between the web-like elements can be reinforced further.

The method for producing a web-like element is characterised by the measures in claim 31. The advantage of this solution is that only those areas have to be provided with corresponding webs, for example in a corrugated cardboard layer, which are required for connecting the components. In this way a closed surface of the elements can be maintained in the other surfaces.

BRIEF DESCRIPTION OF THE DRAWING

Shown is:

FIG. 1 the connecting arrangement according to the invention between two elements in a simplified, perspective view;

FIG. 2 the two elements according to FIG. 1 with the connecting arrangement according to the invention in front elevation and in a separated position;

FIG. 10 a different embodiment of the connecting arrangement between different parts, in front elevation;

FIG. 11 a part of a connecting arrangement with a schematically indicated bending tool, in front elevation;

FIG. 12 a further design of a connecting arrangement according to the invention in front elevation and in a multiple arrangement;

FIG. 15 a part section of the connecting arrangement with a different design of interlocking means on the webs, viewed from above and with the elements separated;

FIG. 16 a further embodiment of the connecting arrangement in a multi-layered component viewed from the front;

FIG. 17 an application possibility of the connecting arrangement according to FIG. 16 viewed from the front and in schematically simplified view;

FIG. 18 a different embodiment of the element with crossing connecting arrangements on a multi-layered component, in simplified perspective view;

FIG. 19 an example of an application of the connecting arrangement according to the invention in a simplified perspective view;

FIG. 22 a further application possibility of the connecting arrangement in cross section along the lines XXII—XXII in FIG. 23;

FIG. 23 the connecting arrangement in front elevation according to arrow XXIII in FIG. 22;

FIG. 25 an illustration of a schematic and simplified arrangement for producing the connecting arrangement according to the invention in front elevation;

FIG. 26 a cutting attachment for the arrangement according to FIG. 25 in a side and enlarged view;

DESCRIPTION OF THE PREFERRED EMBODIMENTS

Figure 3:
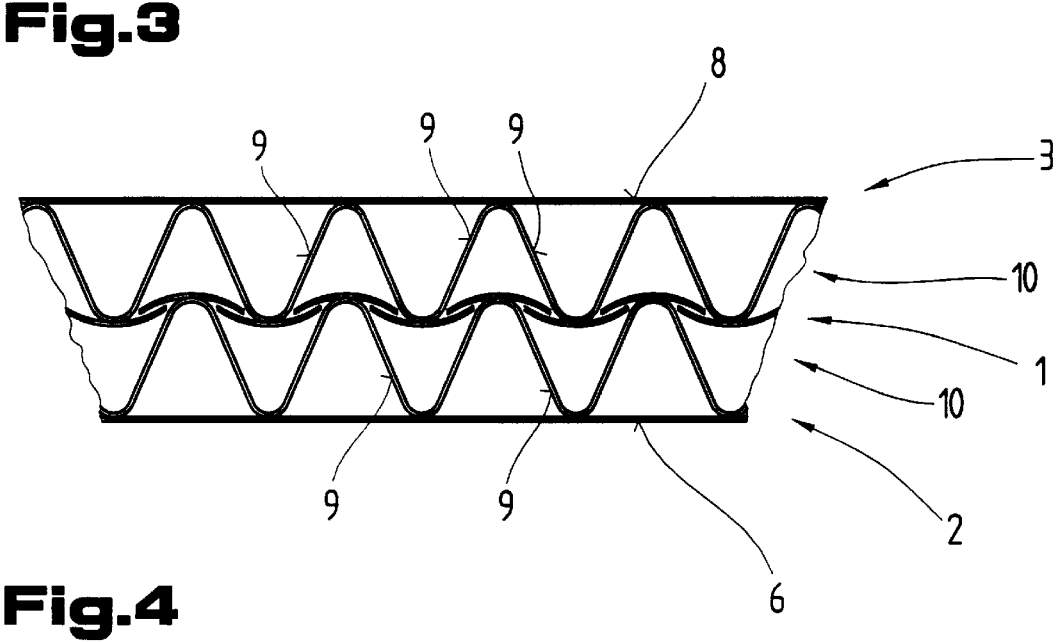
FIG. 3 the two elements with the connecting arrangement according to the invention in front elevation in a connected position and on an enlarged scale.

In FIGS. 1 to 3 a connecting arrangement 1 is shown between web-like or planar elements 2, 3, such as e.g. corrugated cardboard 4.

The element 2 in the present embodiment comprises an upper layer 5 and a lower layer 6 and element 3 also comprises an upper layer 7 and a lower layer 8, whereby the upper layers 5 and 7 of the elements 2, 3 face one another. Between the upper layers 5 and 7 and lower layers 6 and 8 of the elements 2, 3 a core is arranged which in this embodiment comprises individual longitudinal ribs 9 which are connected together e.g. by circular segments and are inclined relative to one another, i.e. are aligned at an angle to the layers 5, 7 and form a corrugated layer 10. The corrugated layer 10 is connected to the upper layers 5 and 7 and lower layers 6 and 8 by means of an adhesive layer. Elevations 11 and depressions 12 of the corrugated layer 10 are connected non-positively and positively in the regions of the circular segments facing the upper layer 5 or 7 and the lower layer 6 or 8 in schematically indicated connecting regions 13, which run in the longitudinal extension of the corrugated layer 10. The individual layers 5 to 8 can be single or multi-layered and preferably comprise layers of cardboard and/or paper and/or plastic made of primary or secondary materials or recycled materials. Of course, the individual layers 5 to 8 can also be made of other evensurfaced materials, in particular bend-resistant or rigid panels made of any materials, such as wood, hard fibre, sheet metal or sandwich components and the like.

The corrugated layer 10 has a spacing 14 between the depressions 12 and elevations 11 at right angles to its longitudinal extension, which extends regularly across the width of the elements 2, 3 and defines the height 15 of the elements 2, 3. Depending on the spacing 14 or height 15 selected it is possible in a simple manner to influence the properties of strength and rigidity of the elements 2, 3. In the present embodiment the spacing 14 and height 15 of the individual elements 2, 3 are equal. It is of course also possible for the spacing 14 and height 15 to be different, whereby special effects can be obtained which are described in the following Figures in more detail. This also applies to the production of the connecting arrangement 1 according to the invention.

The facing upper layers 5 and 7 of the elements 2, 3 are cut in the direction of the connecting regions 13 between the elevations 11, whereby webs 16, 17, 18 and 19 are formed on element 2 or webs 20, 21, 22, 23 and 24 on element 3 and form linking parts, which have a web width 25 which in the present embodiment is smaller than the spacing 14. The webs 16 to 19 of element 2 engage behind the webs 20 to 24 of element 3 or vice versa on the side facing the respective lower layer 8 or 6. Said webs 16 to 24 are strip-like and designed to have a rectangular cross section and are arranged with their longitudinal axis central to the connecting region 13 with the longitudinal ribs, and project over the latter at right angles to their longitudinal extension, whereby the webs 16 to 19 and 20 to 24 lie approximately in a common plane. It is preferable, but not necessary, for the individual webs 16 to 19 and 20 to 24 to be spaced apart from one another by a width 26 which is the result of subtracting the web width 25 from the spacing 14. Furthermore, facing end sections of the webs 16 to 19 and 20 to 24 can be deformed in the direction of the depressions 12 thereby having a convex design.

As can be seen better in FIG. 2 the two elements 2, 3 are shown in a position prior to interconnection offset relative to one another by the half spacing 14. It can be seen clearly that the web width 25 of the webs 16 to 19 and 20 to 24 is greater than the width 26 between the edge regions or longitudinal side edges of the individual webs. The connecting arrangement 1 according to the invention is formed by the elements 2, 3 between the individual webs 16 to 19 and 20 to 24, as can be seen best in FIG. 3. It is essential here that in this embodiment the elements 2, 3 are designed to be the same on their facing surfaces or layers 5, 7, i.e. have the same spacing and that part of the connecting arrangement 1 is arranged on each element 2, 3. It is of course possible to design each layer 5, 7 with different web widths 25.

By means of the relative convex design of the webs 16 to 19 and 20 to 24 the corrugated connecting arrangement 1 is produced, which is formed in that the facing upper layers 5 and 7 and the webs formed therefrom are interconnected along their longitudinal extension, whereby in a simple manner the flat connecting arrangement 1 between the individual elements 2 and 3 is produced. This interconnection can as indicated schematically in FIG. 3 by arrows on the one hand be performed by pressing together the elements 2, 3 in the direction of the upper layers 5, 7 and on the other hand by an offset interconnection of the webs 16 to 19 and 20 to 24 in the longitudinal direction of the corrugated layer 10. In this way the connecting arrangement 1 can be locked snappably and displaceably in longitudinal direction, characterised in addition in that it can be repeatedly separated and reconnected without damage, as the connection is purely mechanical, and chemical connecting means can be dispensed with completely.

The strength and rigidity of the connecting arrangement 1 can be varied in a simple manner both by the selection of the composition or the material content or binding agent content and the like of the layers 5 and 7 and the dimensions of the web widths 25 in relation to the widths 26 between the individual webs 16 to 19 and 20 to 24.

Very different substances can be used as the material for the individual elements 2, 3, e.g. paper, cardboard, pasteboard, plastics and recycled materials with a range of different material strengths, compositions and recipes. Of course, it is also possible to combine these different substances or materials in any amounts. For the production of the elements 2, 3 and the corrugated cardboard 4 all methods and devices known from the prior art can be used.

It is thus possible for example to combine one of the layers 5 to 8 made of a plastic film with a corrugated layer 10 made of cardboard or pasteboard or vice versa.

Figure 4:
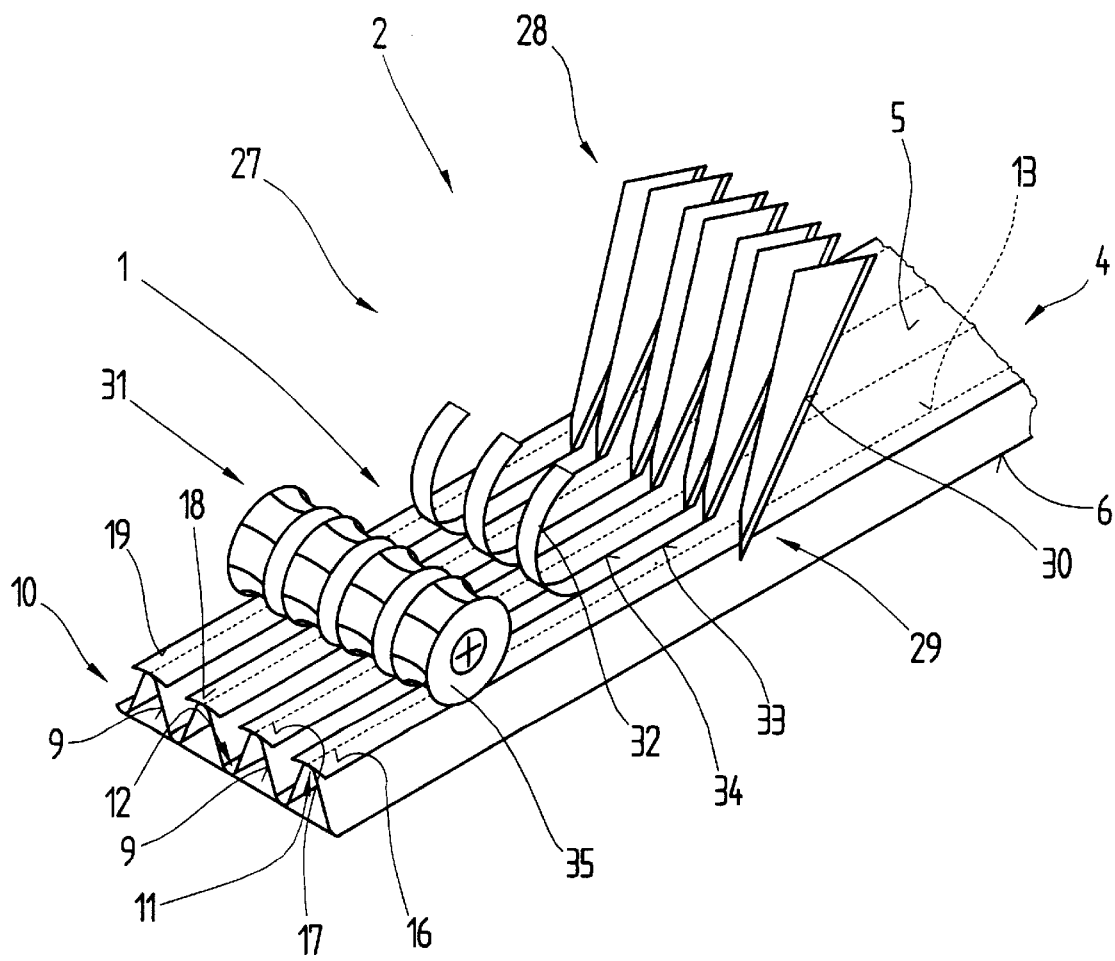
FIG. 4 a schematically shown device for producing the connecting arrangement according to the invention on an element in a perspectively simplified view.

FIG. 4 shows a schematically indicated machining device 27 comprising a cutting device 28 which in the present embodiment is formed by a cutting attachment 29 with schematically indicated knives 30 and a bending tool 31. Instead of using knives 30 for the cutting device 28 it is of course also possible for the latter to be in the form of blades, rotating discs, lasers etc. Here either the tool can remain still and the machining device 27 be moved or the machining device 27 can remain still and the tool be moved past for working.

In order to produce part of the connecting arrangement 1 on element 2 it is advantageous with the cutting device 28 to cut the upper layer 5 of the element 2 between the elevations 11 of the corrugated layer 20, whereby a strip 32 is cut out of the upper layer 5 which has the above-mentioned width 26. Of course, the same also applies to the upper layer 7 of the element 3.

On cutting the upper layer 5 or 7 it should be ensured that the direction of the cut lines 33, 34 runs precisely in the longitudinal direction of the corrugated layer 10 and parallel to the connecting region 13, as otherwise a secured insertion or connection of the elements 2, 3 is not possible and in the cutting process individual corrugated layers 10, in particular the elevations 11, are cut which can lead to a detachment of the individual webs.

Preferably, after the cutting device 28 the webs 16 to 19 can be deformed convexly from the rectangular cross sectional shape of individual webs by the bending tool 31 which is designed in the form of concave press rollers 35, and in this way circular cut outs are formed. By means of the bending tool 31 the facing edge regions of the webs 16 to 19 and 20 to 24 are deformed in the direction of the depressions 12. Thus part of the connecting arrangement 1 is produced on an element 2 or 3. This deformation can however also be made permanent by temperature and/or pressure and/or moisture.

Figure 5:
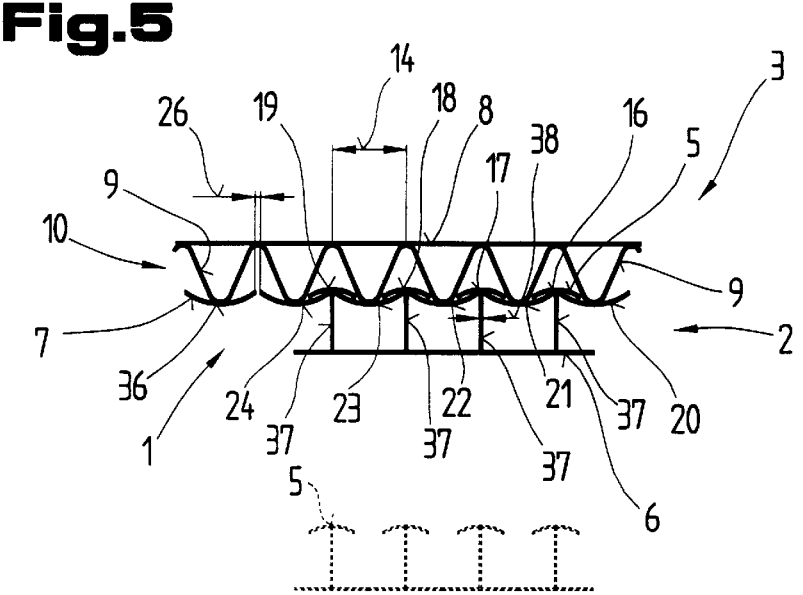
FIG. 5 a further embodiment of the connecting arrangement according to the invention between different parts, in front elevation.

In FIG. 5 a further embodiment of the connecting arrangement 1 between the elements 2, 3 is shown, whereby for the same parts the same reference numbers are used in the description.

Element 3 comprises, as already described, an upper and lower layer 7, 8 and a core in between formed by the corrugated layer 10. It is shown on the left part of this drawing between web 24 and a further web 36, that the cut of the upper layer 7 is only made along a straight line which is aligned parallel between the connecting regions 13. In this way, the facing edge regions of the individual webs 20 to 24, 36 determined by the convex deformation thereof are spaced apart from one another by the width 26 which is sufficient in turn to insert longitudinal ribs 37 between them which form the core of the element 2 and are joined to the lower layer 6. The longitudinal ribs 37 have a thickness 38 perpendicular to their longitudinal extension whereby only the upper layer 7 of the element 3 needs to be cut and thus a greater strength of the connecting arrangement 1 is ensured.

It is however also possible to enlarge the width 26 between the facing regions of the individual webs 20 to 24, 36 or design it to be wider, whereby it is possible in a simple manner to adjust the strength of the connecting arrangement 1 to the desired conditions of use.

In this embodiment a possible combination of different elements 2, 3 is also shown in which the element 3 is formed from a cardboard layer, e.g. single-layered corrugated cardboard 4, and element 2 is made of a web of plastic material produced by extrusion for example. It should merely be ensured than a corresponding part of the connecting arrangement 1 is present on each individual element 2, 3 which are aligned relative to one another with respect to the spacing 14.

In FIGS. 6 to 9 further embodiments of the connecting arrangement 1 are shown in which the same reference numbers are again used for the same parts.

Element 2 in the present embodiment comprises a single-layered corrugated cardboard 4 which is formed from the upper and lower layer 5, 6 and the core arranged therebetween. The upper layer 5 is divided respectively into webs 16 to 19 which are connected along schematically indicated connecting regions 13 on the individual elevations 11 to the corrugated layer 10 of the core.

Furthermore, in the front region of the element 2 it is shown that the individual webs 16 to 19 are in addition designed to be interrupted at right angles to their longitudinal extension and also the corrugated layer 10 through to the lower layer 6 is removed or omitted, thereby forming cross channels. In this way, the individual web parts 39 to 42 are formed from the individual webs which are spaced apart from one another in the longitudinal direction of the webs by a distance 43 and have a length 44. Determined by the length 44 and web width 25 of the individual web parts 39 to 42 and the width 26 and distance 43 the strength of the connecting arrangement 1 can be influenced in a simple way.

Figure 7:
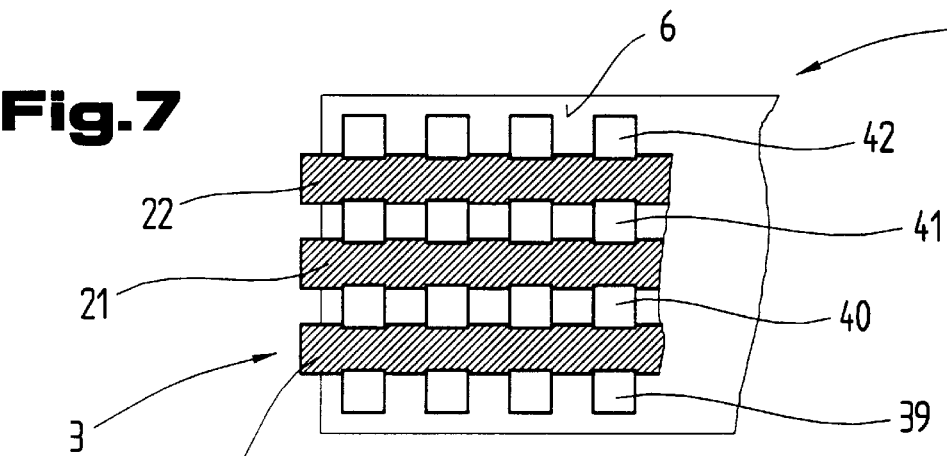
FIG. 7 the connecting arrangement according to FIG. 6 viewed from above with interconnected elements.
Figure 8:
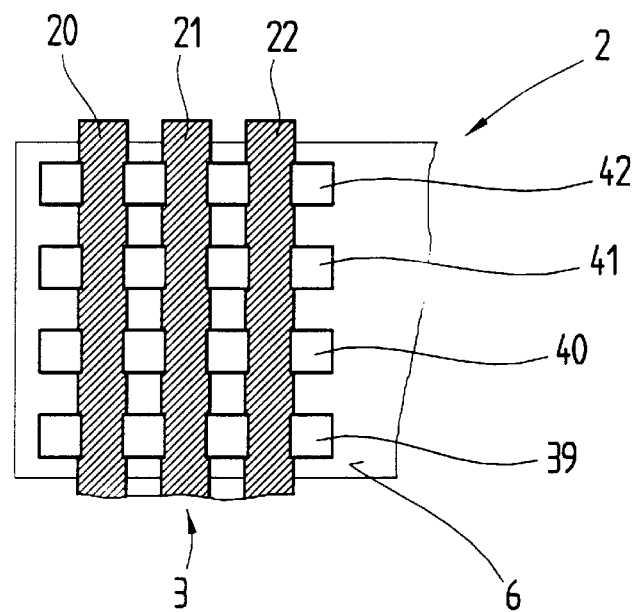
FIG. 8 the connecting arrangement according to FIGS. 6 and 7 viewed from above with interconnected elements in angular alignment.

In this way it is also possible as indicated schematically in FIGS. 7 and 8 to connect the element 3 with the through webs 20 to 22 both in the longitudinal extension of the element 2 and also 90° C. thereto, i.e. at right angles to its longitudinal extension. Here an appropriate selection of the web width 25 of the webs 20 to 22 of the connecting arrangement 1 in relation to the web width 25 of the webs 20 to 22 of element 3 should be made.

It is however also possible to replace the individual web parts 30 to 42 and the corrugated layer 10 below with finger-like projections which correspond in cross section to the individual areas and to connect them with the lower layer 6 or to design them in one piece therewith. For example various plastics, pressed papier-mâché, wood etc. can be used as the materials.

Figure 9:
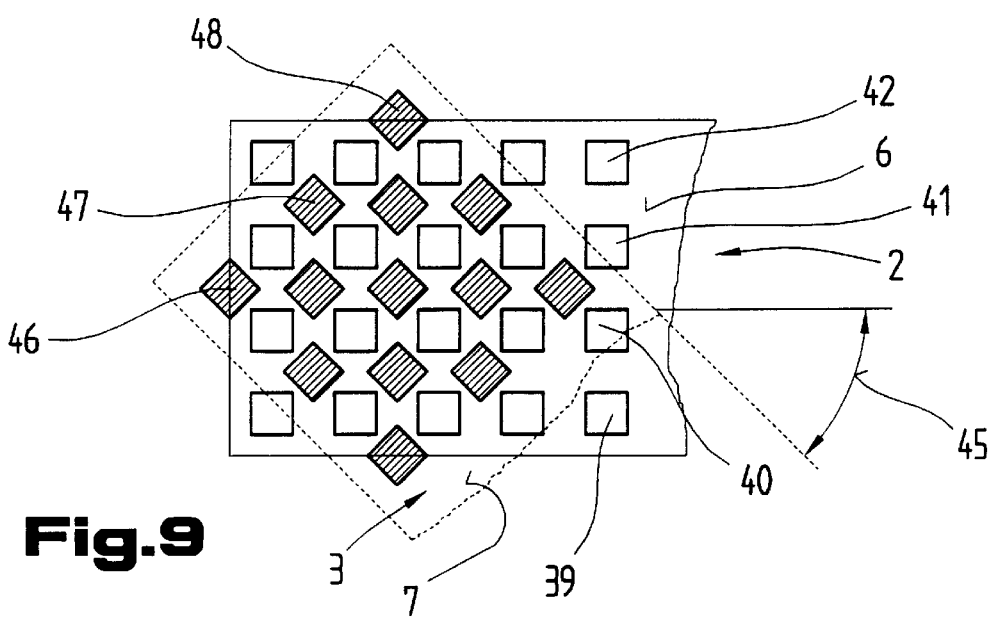
FIG. 9 a further possibility for connecting elements with the connecting arrangement according to the invention according to FIGS. 6 to 8 viewed from above.

In FIG. 9 a further simplified possibility is shown in which it is shown that if the connecting arrangement 1 on the elements 2 and 3 is designed correspondingly it is possible to arrange the latter relative to one another at an angle 45, in the present case of 45°, whereby again the individual web parts 39 to 42 of the element 2 are in engagement with web parts 46 to 48 of the element 3. In order ensure the engagement of the individual web parts 39 to 42 and 46 to 48 it is necessary to arrange the individual web parts of the element 3 offset relative to one another, so that this is achieved perfectly.

In FIG. 10 a further embodiment of the connecting arrangement 1 is shown between element 2 which is formed from single-layered corrugated cardboard 4 and an additional element 3. Here element 3 is shown in its undeformed state by dashed lines before the interconnection of the connecting arrangement 1. Element 3 comprises an elastic substance, e.g. plastic, foamed plastic or Styropor, in which with the corresponding spacing 14 to element 2 corresponding recesses 49 extending in longitudinal direction are arranged on the side assigned to the upper layer 5 of the element 2 and have a breadth 50 which is equal to or smaller than the web width 25 of webs 16 to 19. In this way it is ensured, as shown in the interconnected position of the connecting arrangement 1 that the individual webs 16 to 19 elastically deform the material of the element 3, whereby in turn a secure connection can be formed between the elements 2, 3. The strength of the connecting arrangement 1 can be controlled in a simple manner by the selection of the web width 25 in relation to the breadth 50 of the recess 49 and by the selection and design of the elastic material. It is however also possible to make the element 3 from a less elastic material or a material with a rapid surface, e.g. wood, chipboard, papier-mâché or the like, and to use the elastic deformation of the individual webs 16 to 19 to form the holding force of the connecting arrangement 1.

In FIG. 11 a further possible embodiment of part of the connecting arrangement 1 on an element 2 is shown schematically.

Here the upper layer 5 is cut along cut lines which run parallel to the elevations 11 of the corrugated layer 10, and the individual webs 16 to 19 produced hereby are deformed inwards at their ends in the direction of the corrugated layer 10 by means of a schematically indicated bending device 51. Thus a rounded transition is formed on the edge regions which permits the interconnection or later separation of the connecting arrangement 1 in a simple way and prevents the webs penetrating too far into the opposite material.

In FIG. 12 a further embodiment of the connecting arrangement 1 between the elements 2 and 3 is shown whereby the same reference numbers are used for the same parts.

In this embodiment of the connecting arrangement 1 of the elements 2, 3 both the upper layers 5, 7 and the lower layers 6, 8, are cut accordingly and the strip 32 removed, whereby part of the connecting arrangement 1 is formed on both sides of the single-layered corrugated cardboard 4 of the elements 2, 3. In this way it is possible to connect several elements 2, 3 together whereby a multi-layered body 52 can be formed. This is achieved e.g. in that element 3 is pushed together in its longitudinal extension at right angles to the corrugated layer 10 and element 2 is extended accordingly in its longitudinal extension, whereby a simple interconnection is possible. It is also possible that with element 2 and 3 the upper layer 5 or 8 with its webs is completely removed or omitted and thus a corrugated surface is formed on both outer sides.

Moreover, it is also possible by means of this embodiment in which both the upper and lower layer of two elements 2, 3 are connected to webs, to form a multi-layered composite component, so that in a simple manner web-like elements can be created which can take different loads.

This can be an advantage, e.g. for packaging purposes, as for example a suitable reinforcement of the packaging layer can be provided at specific points which also have a fixed connection with the continuous elements 2, 3. It is however also possible in certain circumstances to alter the spacing in certain regions in order to obtain different degrees of strength in different sections.

By connecting several elements 2, 3, in which the longitudinal ribs are arranged with a different spacing relative to one another it is possible depending on the relationship between the spacings to produce multi-layered curved web-like elements. The curvature can be reduced by increasing the difference between the spacings of the longitudinal ribs of the web-like elements 2, 3 to be connected. That is, with a greater difference between the spacing of the longitudinal ribs in the two elements 2, 3 a greater curvature of the composite component formed therefrom is possible.

Figure 13:
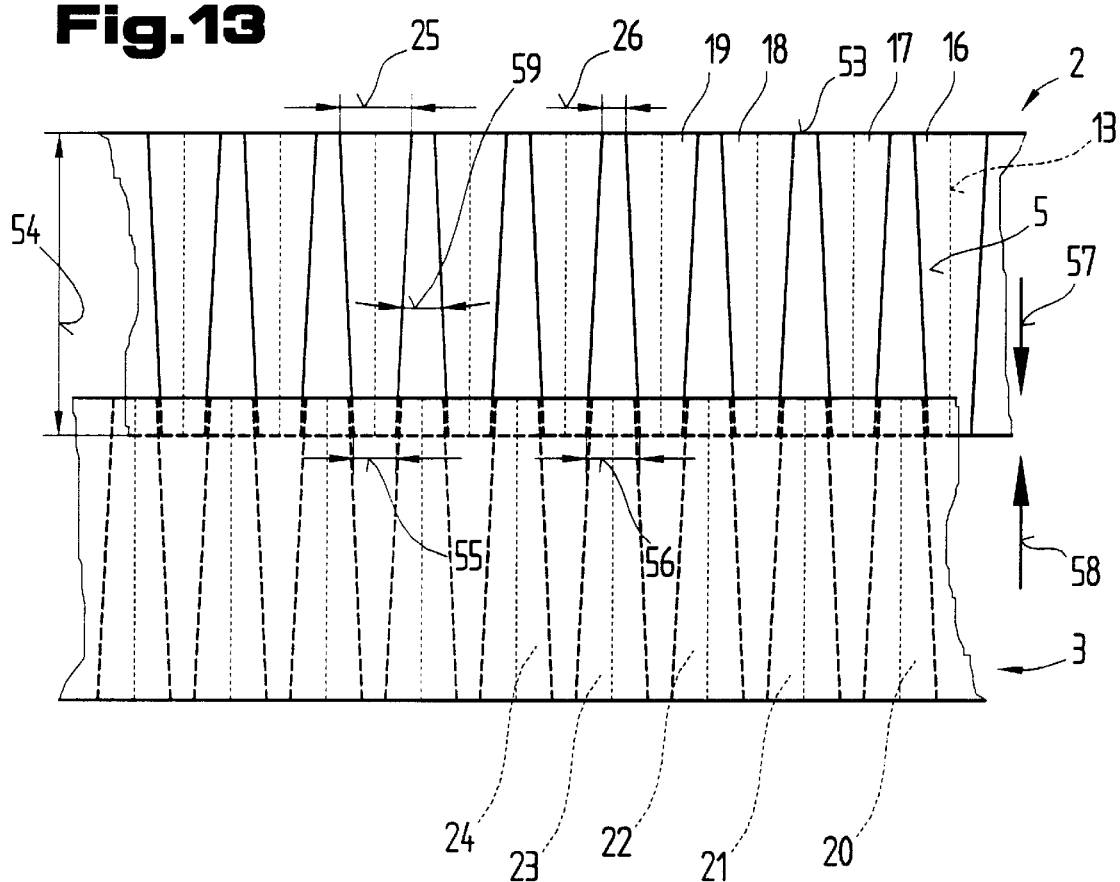
FIG. 13 a different development of the connecting arrangement with wedge-shaped webs, viewed from above and in a simplified schematical view.

FIG. 13 shows schematically a conical arrow-shaped design of the individual webs 16 to 19 of the upper layer 5 of the element 2 and the webs 20 to 24 of the upper layer 7 of element 3. Here the web width 25 decreases from an end region 53 over the length 54 of the element 2 to a web width 55, whereby the width 26 between the individual webs 16 to 19 increases over the length 54 to a width 56. A part of the connecting arrangement 1 is designed in element 3 to be in reverse, whereby on fitting together the two elements 2, 3, according to the arrows 57, 58, the webs 16 to 19 of element 2 wedge together with the webs 20 to 24 of element 3.

By selecting the web widths 25 and 55 and the resulting widths 26 and 56 between the individual webs an angle 59, which can be described as a conical angle, can easily be adjusted to the corresponding separating force between the individual elements 2, 3. The flatter the angle 59 the farther the two elements 2, 3 can be fitted together and at the same time automatic locking also occurs.

Figure 14:
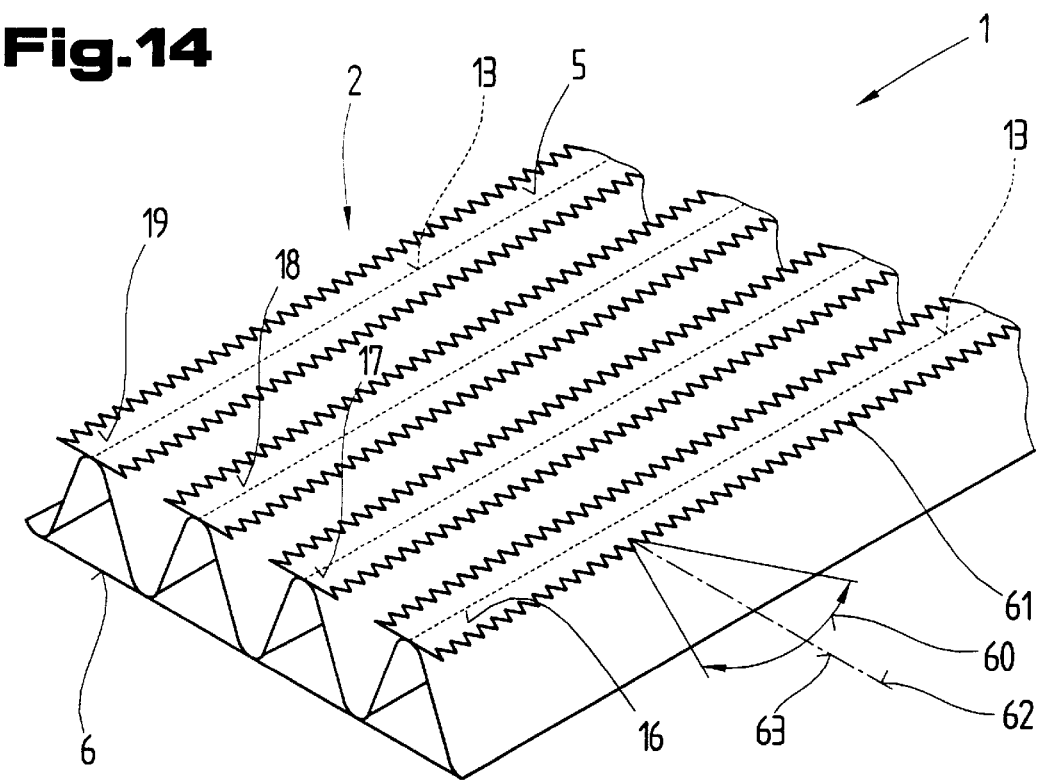
FIG. 14 a part of the connecting arrangement on an element with interlocking means arranged additionally on the webs in a perspectively simplified view.

FIG. 14 shows a further design of the edge regions of the individual webs 16 to 19 which are designed to be planar, i.e. completely parallel to the lower layer 6. The construction of the connecting arrangement 1 corresponds essentially to FIGS. 1 to 4, whereby the same reference numbers are used for the same components. The groove angle 60 of the locking noses 61 which are arranged on both sides in the longitudinal direction of the webs 16 to 19 is aligned approximately symmetrically relative to the perpendicular 62 of the connecting region 13. The symmetry axis 63 of the groove angle 60 is in the present embodiment the perpendicular 62. In this way with the connection of the individual elements 2, 3 viewed in longitudinal direction there is equal resistance with respect to the interconnection or separation of the connecting arrangement 1.

In FIG. 15 however it shown that, the symmetry axis 63 of the groove angle 60 of the locking noses 61 in relation to the perpendicular 62 of the connecting region 13 is inclined at an angle 64 thereto. Because the webs 16, 17 and 20 to 22 of the elements 2, 3 shown in this Figure are identical in design the result of interconnecting the connecting arrangement 1 is that the elements 2, 3 can only be pushed together in one direction and because of the design of the individual locking noses 61 they automatically prevent each other from being disconnected. In this way an interlocking system or connecting arrangement 1 is created which can be pushed together easily in one direction and locks itself automatically in the opposite direction whereby an almost stepless securing or pushing together of the elements 2, 3 is possible.

FIG. 16 shows a different embodiment of the connecting arrangement for an element 2 which in the present embodiment is formed from multi-layered corrugated cardboard 4.

On both sides of an intermediate layer 65 of the element 2 on rest surfaces a separate core is arranged, comprising the corrugated layer 10 and delimited by the upper or lower layer 5, 6, whereby the elevations 11 or depressions 12 of the respective corrugated layer 10 are arranged offset relative to one another by a half spacing 14. It is however also possible for the spacing 14 of the individual corrugated layers 10 relative to one another to be different. The two layers 5, 6, as already described above, are cut accordingly, whereby webs 66, 67, 68 and 69 are formed on a lower side 70 and webs 16 to 19 on an upper side 71 of the element 2. In this way a part of the connecting arrangement 1 is formed both on the lower side 70 and the upper side 71 of the element 2 whereby it is possible simply to connect further elements 3 with the latter via the connecting arrangement 1 on both sides of the element 2.

A corresponding application example of the two-sided arrangement of the connecting arrangement 1 on the element 2 is indicated schematically in FIG. 17. Here an item 72 which is to be packed and protected, e.g. for transportation purposes, is surrounded by the element 2 described in FIG. 16 and overlapped in a connecting region 73 thereof, whereby it is possible in a simple way to connect the two ends of the element 2 by means of the connecting arrangement 1 arranged on both sides. In this way, any kind of additional connecting aids can be dispensed with, whereby on the one hand rapid packing is possible and on the other hand the number of additional parts can be reduced, thus simplifying the packing process and reducing the costs.

In FIG. 18 a part of the multi-layered element 2 is shown, in which part of the connecting arrangement 1 is arranged on both sides thereof. The element 2 comprises the intermediate layer 65 and the cores arranged on both sides thereof with their corrugated layers 10. Unlike the design in FIG. 16 the relative alignment of the individual corrugated layers 10 with their webs 16 to 19 and 66 to 69 arranged thereon is at right angles, i.e. at an angle of about 90°. In this way, it is possible in a simple manner to use the element 2 universally, whereby a connection with other elements is possible depending on the desired alignment of the individual connecting arrangements 1.

In FIG. 19 an embodiment of the connecting arrangement 1 is shown in which a body 74 is formed for transport or packaging purposes from assemblable or foldable side parts 75 and a middle part 76 connecting the side parts 75.

Because of the connecting arrangement 1 arranged on the inside of the side parts 75 and the outside of the middle parts 76 it is now possible in a simple way to adjust the volume or capacity of the body 74 to the desired conditions of use, whereby at any time a simple adjustment of the side parts 75 in the direction of double arrow 77 is possible. The connecting arrangement 1 which is arranged both on the middle part 76 and on the side part 75 serves both to connect, guide and reinforce the body 74. It is of course also possible only to use side parts 75 with correspondingly arranged connecting arrangements 1.

Figure 20:
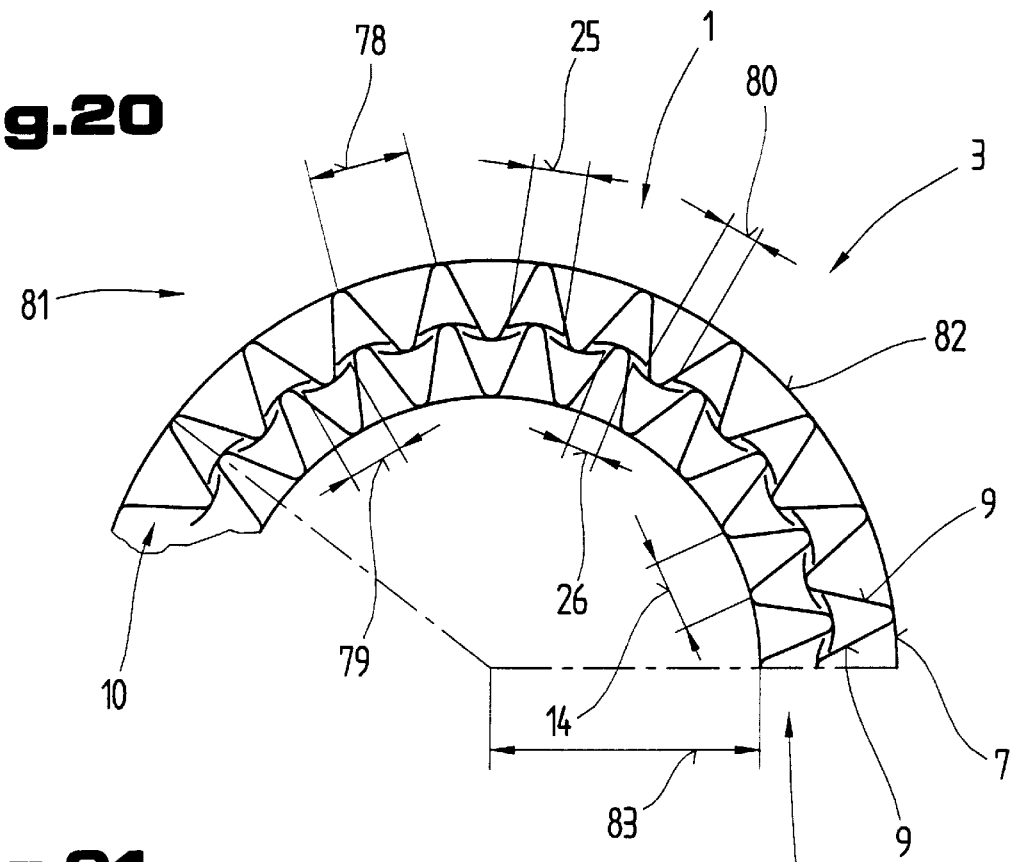
FIG. 20 a further embodiment of the connecting arrangement in an element in multi-layered design with different construction dimensions for forming a cylinder segment in front elevation.

In FIG. 20 the elements 2, 3 are shown with an interlocked connecting arrangement 1, and the same reference numbers are used for the same components.

Element 2 in contrast to element 3 in the present embodiment has a different spacing 14, width 26 and web width 25 compared to spacing 78, web width 79 and width 80. By having different spacings, web widths or widths it is possible to create a component 81 which forms a cylinder casing 82 with a predeterminable radius 83. Thus it is possible also to prefabricate cylinder segments with a predeterminable radius and angle which viewed in longitudinal direction possess high individual rigidity and also a smooth, bend-free and round surface.

Figure 21:
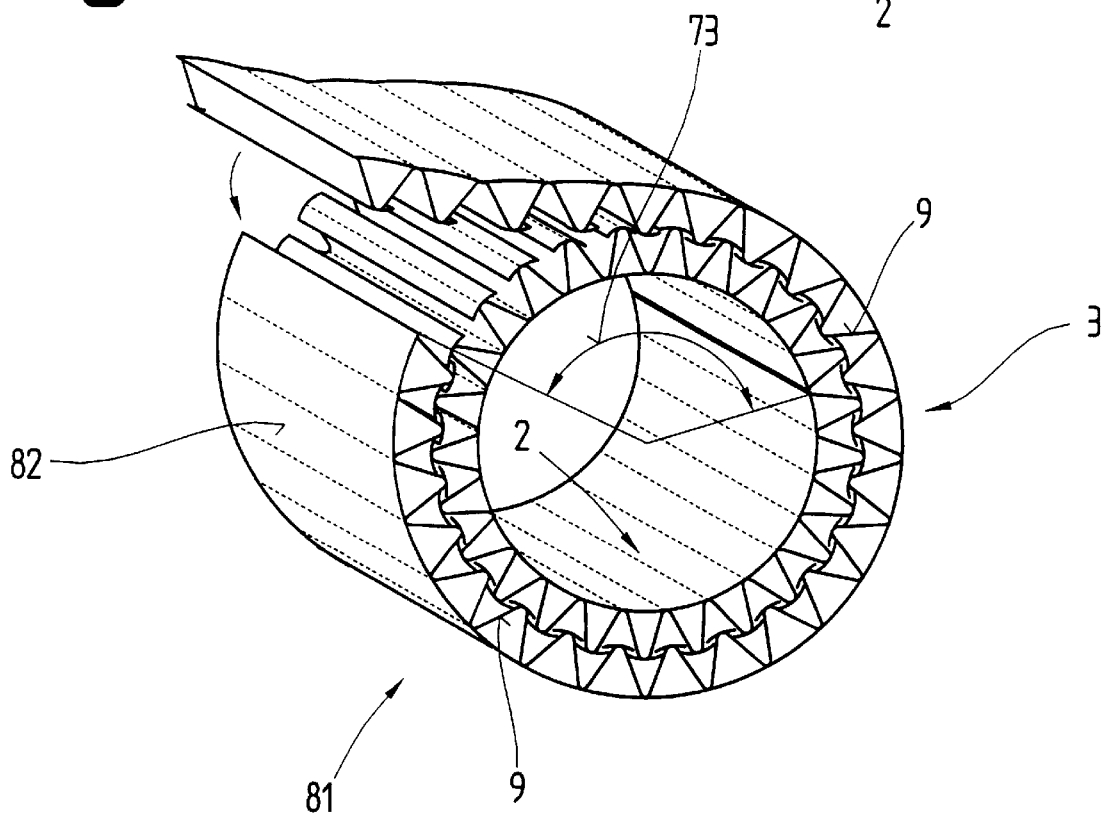
FIG. 21 an example of an application of the connecting arrangement according to FIG. 20 in perspective simplified view.

In FIG. 21 the multi-layered component 81 is shown with the elements 2, 3, arranged offset relative to one another in the peripheral region, which elements form the connecting region 73 and serve to completely close the cylinder casing 82. Thus it is possible in a simple way to surround round objects and in a connecting region 73 to close the cylinder casing 82 to form a single component by using the connecting arrangement 1 without additional connecting means. The strength of the connection can be adjusted by the length of the connecting region 73.

In FIGS. 22 and 23 a further embodiment of the connecting arrangement 1 is shown in which a component 84, e.g. for transportation or packaging purposes, can be transformed from a single-layered element 2 to a collapsible component 84 by means of a corresponding arrangement of indentations 85. Here the indentations 85 runs in a diagonal direction relative to the longitudinal extension of the individual webs 16 to 19.

In the present embodiment of the element 2 both the upper and the lower layer 5, 6 are cut and the strip 32 is removed whereby part of the connecting arrangement 1 is formed on both sides of the core. In this way, it is possible to interconnect facing wall parts 86, 87 of the element 2 in the connecting region 73 by means of the connecting arrangement 1 without any additional auxiliary means. By the arrangement of the individual indentations 85 on element 2 any foldable cross sectional shape can be obtained simply for the component 84 and with a corresponding selection of the length of the connecting section 73 the strength of the connection can also be controlled.

This simple way of connecting the two wall parts 86, 87 of the element 2 is possible by displacing the webs 16 to 19, which are arranged on the outside of the component 84, relative to webs 88 to 90 which are arranged on the inside of the component 84. This is possible in a simple way by the offset arrangement of the individual webs on the elevations 11 and depressions 12 of the corrugated layer 10. The latter can if necessary be separated and afterwards reconnected without using much force as the connection has a purely mechanical basis.

Figure 24:
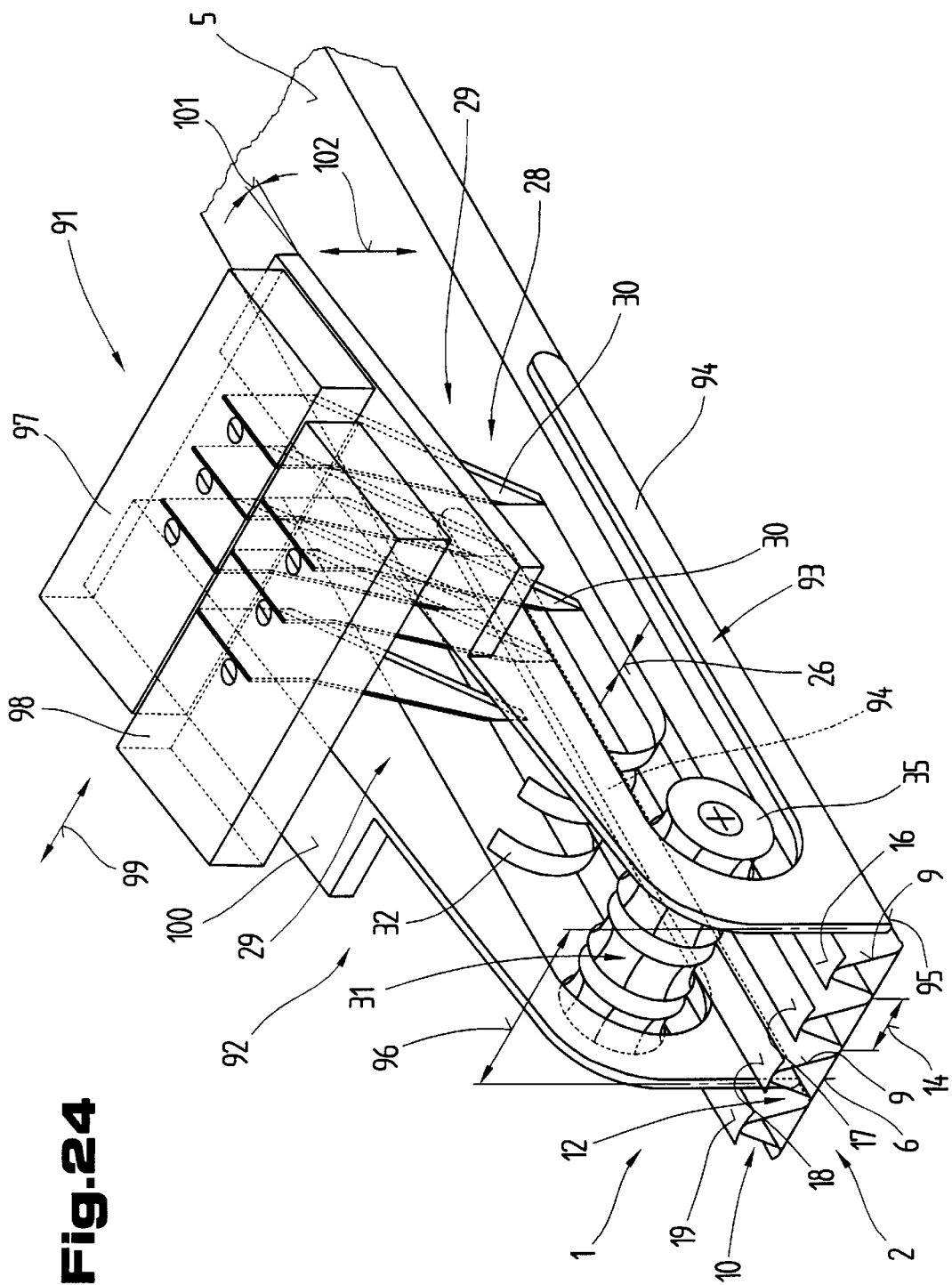
FIG. 24 a schematically simplified hand tool for producing the connecting arrangement according to the invention on an element in perspective simplified view.

In FIG. 24 a schematically indicated machining device 91 is shown which in the present embodiment is formed by the cutting device 28, for example individual knives 30 and a carriage 92.

In order to obtain a precise guiding of the machining device 91 relative to the longitudinal extension of the corrugated layer 10 the cutting device 28 is arranged on the stirrup-shaped carriage 92. On the side facing the element 2 the carriage 92 has guiding devices 93 which in the present embodiment are formed by extensions 94. The two extensions 94 of the carriage 92 each form on the side facing the layer 6 of element 2 a guide surface 95, which are supported on the depressions 12 of the corrugated layer 10. Here the distance 96 between the two guide surfaces 95 of the guiding devices 93 must be a multiple of the spacing 14 of the corrugated layer 10. In this way it is ensured that on cutting the upper layer 5 of the element 2 the machining device 91 is guided precisely in the longitudinal direction of the corrugated layer 10, whereby on cutting this layer 5 the individual webs 16 to 19 are formed.

In order to change the width 26 or the breadth of the strip 32 between the individual webs 16 to 19 in a simple manner the cutting device 28 in the present embodiment comprises two cutting attachments 29 arranged offset relative to one another which are mounted on the holding devices 97, 98 assigned thereto. Here the distance between the individual knives of each cutting attachment 29 is to be aligned according to the spacing 14.

As also shown schematically it is possible to offset the two holding devices 97, 98 relative to one another according to the double arrow 99 to a bearing surface 100 of the carriage 92 at right angles to the longitudinal extension of the corrugated layer 10, whereby the width 26 between the individual webs 16 to 19 can be varied accordingly.

In order to adjust the cut depth of the cutting device 28 in the present embodiment the bearing surface 100 of the carriage 92 relative to the layer 5 of the element 2 is inclined at an angle 101, whereby with respect thereto an oblique plane is formed, on which the two holding devices 97, 98 are adjustable in height according to a double arrow 102. The retaining or securing of the holding devices 97, 98 and the knife 30 thereon can be performed in any way, as known from the prior art.

Preferably, after the cutting device 28 the webs 16 to 19 can be deformed convexly by the bending tool 31 which is in the form of concave press rollers 35 which are rotatably mounted in the stirrup-shaped connecting region of the extensions 94 with the bearing surface 100.

It is of course also possible to use blades, rotating discs, lasers etc. instead of the knives 30 of the cutting device 28 shown. It merely needs to be ensured that the cutting of the upper layer 5 and 7 is performed precisely in the longitudinal direction of the corrugated layer 10 in order subsequently to ensure a perfect interconnection of the connecting arrangement 1 according to the invention.

In FIG. 25 a different arrangement 103 for producing the connecting arrangement 1 on element 2 is shown.

The arrangement 103 comprises a support device 104, e.g. a shaft 105, which on its outer side has an outer surface shape designed to correspond with the corrugated layer 10 and a cutting device 106. The cutting device 106 is designed as a shaft-shaped component 107, on the outer surface of which ribs 108 are arranged spaced apart from one another in peripheral direction. Slits 109 are formed between the spaced apart ribs 108 which serve to mount cutting attachments 110.

On passing the layer 5 with the core attached thereto, e.g. the corrugated layer 10, between the support device 104 and the cutting device 106 the corrugated layer 10 is supported on extensions 111 of the shaft 105, whereby because of the opposite movement of the support device 104 and the cutting device 106 in the direction of the arrows 112, 113 the individual cutting attachments 110 arranged on the periphery of the cutting device 106 cut the layer 5 accordingly, whereby individual webs 16 to 19 are formed on the elevations 11 of the corrugated layer 10.

By means of a correspondingly concave design of the ribs 108 on the surface facing the support device 104 it is possible to shape the facing edge regions of the webs 16 to 19 in the direction of the depressions 12 of the corrugated layer 10.

In this process between the support device 104 and the cutting device 106 on the one hand the layer 5 is cut accordingly and on the other hand the strip 32 cut between the webs is removed at the same time and is if necessary removed from the cutting attachment 110 on the further rotation of the component 107 at a point provided for this. In this way the emptied cutting attachment 110 is prepared for a further cutting process.

After the cutting and shaping process it is possible to join the lower layer 7 to the corrugated layer 10 to form element 2. For this the corrugated layer 10, which after exiting the support device 104 or the cutting device 106 at right angles to its longitudinal extension has a slightly variable form, is aligned in a separate positioning device 114 according to the desired spacing 14 and is joined in this state to the lower layer 7 by means of a pressing device 115. Thus the corrugated layer 10 is connected to the lower layer 7 according to the spacing 14 whereby element 2 or 3 is formed.

The individual drives and controls of the various devices are not shown and can be formed by any components, as known from the prior art.

For a perfect cutting process it is necessary to select a distance 116 of the cutting edges 117 and 118 of the cutting attachment 110 and the length of the individual cutting edges so that a perfect cutting process is made possible. In the present embodiment the two cutting edges 117, 118 are shown to be of different lengths. It is however possible for both cutting edges 117, 118 to be of equal length.

Of course, it is possible to arrange an additional cutting device after the positioning device 114 in order also to cut the lower layer 7 accordingly. However, a multiple arrangement or any combination of the individual devices with one another is also possible in order to be able to produce for example a multi-ply or multi-layered construction of the elements 2, 3.

As better shown in FIG. 26 the double-bladed cutting attachment 110 has a serrated design both on cutting edge 117 and cutting edge 118 which extends in the longitudinal direction of the cutting attachment. It is ensured that the cutting process of the strip 32 is performed by selecting the distance 116 and path correspondingly that is necessary to cut through layer 5 completely.

By means of the serrated design of the individual cutting edges 117 and 118 the penetration of the individual cutting edges into the layer 5 is made considerably easier, whereby deformations to the layer 5 during the cutting process are also avoided.

Figure 27:
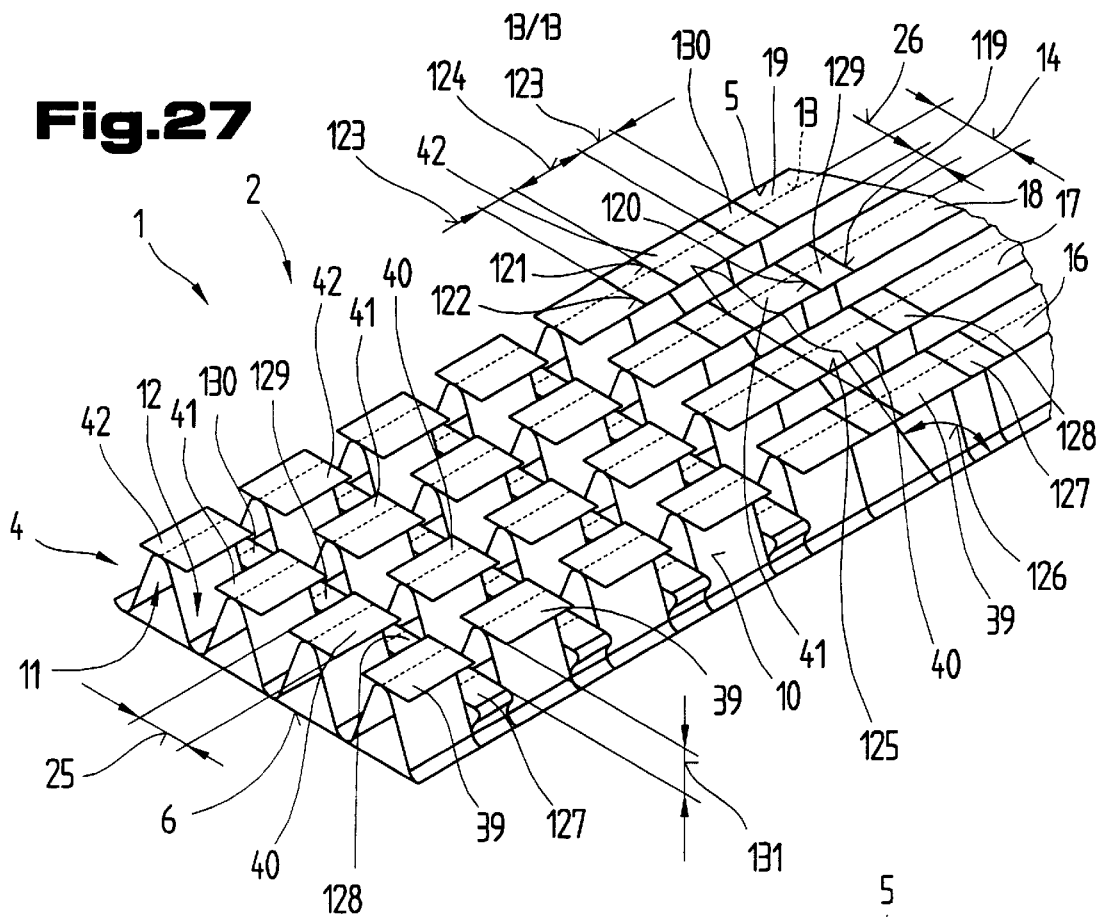
FIG. 27 a further design of part of the connecting arrangement in a perspective schematically simplified view.

In FIG. 27 a further embodiment of the connecting arrangement 1 is shown, in which the same reference numbers are used for the parts described in the previous Figures.

In the present embodiment element 2 corresponds basically to the embodiment according to FIG. 1 and comprises a single-layer of corrugated cardboard 4 which is formed from the upper and lower layer 5, 6 and the core arranged in between. The upper layer 5 is in turn divided into webs 16 to 19 with a web width 25, which along schematically indicated connecting regions 13 are connected in a spacing 14 on the individual elevations 11 to the corrugated layer 10 of the core and their longitudinal side edges are spaced apart at right angles to their longitudinal extension by the width 26.

Furthermore, in the rear part of FIG. 27 it is indicated that the individual webs 16 to 19 of the upper layer 5 are unshaped, i.e. are flat and are also cut perpendicular to their longitudinal extension, whereby cut edges 119 to 122 are formed. Here the distance 123 between the cut edges 119 and 120 and 121 and 122 is smaller than the distance 124 between the cut edges 120 and 121. Thus almost square web parts 39 to 42 are formed between the individual cut edges 120 and 121, as already described in more detail in FIGS. 6 to 9. Here the distance 123 corresponds approximately to distance 43 and distance 124 corresponds approximately to the length 44 in FIG. 6. The depth of the cut edges 119 to 122 can extend from the upper layer 5 cutting through the corrugated layer 10 up to the region of the lower layer 6 whereby it should be ensured that the latter is not cut through as otherwise the entire element 2 will no longer hold together.

The alignment of a cut plane 125 which runs through the individual cut edges 119 to 122 can either be at right angles to the upper and lower layers 5 or 6 or it is also possible to arrange the cut plane 125 at an angle 126 which is greater than 90°, whereby the cut edges 119 of the individual webs 16 to 19 project over the connecting region 13 of the depressions 12 of the corrugated layer 10. Of course, it is also possible for the angle 126 to be less than 90°, whereby in the corrugated layer 10 there is a broader base region for the connection of the corrugated layer 10 to the lower layer 6. By varying the angle 126 the strength and rigidity of the element 2 and 3 in the direction of the longitudinal extension of the corrugated layer 10 can be varied simply.

As can also be seen from the rear part of FIG. 27 web sections 127 to 130 assigned to the individual webs 16 to 19 are formed between the cut edges 119 and 120 and the individual webs 16 to 19, which in their dimensions are formed by the distance 123 between the cut edges 119 and 120 and the web width 25. Furthermore, it should be mentioned that it is of course possible to alter the distances 123, 124 and the web width 25 and the width 26 as desired, but depending on the spacing 14, whereby in turn the strength of the connecting arrangement 1 can be influenced in a simple manner. The individual web sections 127 to 130, as shown in the rear part of FIG. 27, are here arranged in a plane relative to the individual webs 16 to 19 of the upper layer 5. By means of cutting the individual webs 16 to 19 at right angles to their longitudinal extension it is possible in a simple manner to bend the element 2 in any position without an additional tool being necessary.

Figure 6:
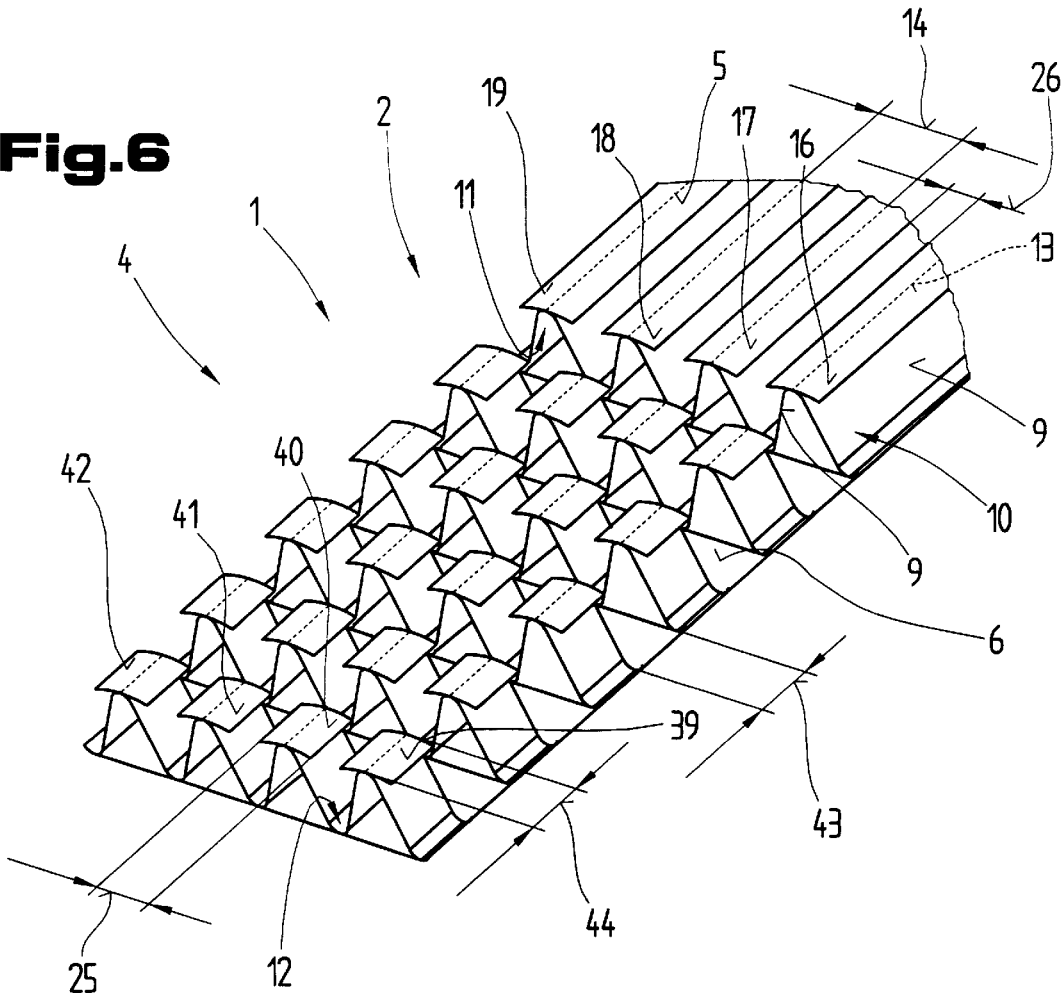
FIG. 6 a further embodiment of part of the connecting arrangement in perspective, schematically simplified view.

It is however also possible as indicated in the front section of FIG. 27 to offset the web sections 127 to 130 relative to the web parts 39 to 42 by a height difference 131 in the direction of the lower layer 6 in order to obtain a similar design to FIG. 6. The only the difference between this embodiment and FIG. 6 is that the individual web sections 127 to 130 with the associated part regions of the corrugated layer 10 remain connected with the lower layer 6 and are only offset vertically e.g. by pressing down the corrugated layer 10 relative to the web parts 39 to 42.

In this way it is possible as already described with reference to FIGS. 7 and 8 to connect element 3 with the continuous webs 20 to 22 both in the longitudinal extension of element 2 and 90° thereto, i.e. at right angles to its longitudinal extension. In this case attention should be paid to the corresponding design of the web width 25 of distance 123 and length 44 as well as distance 124 and distance 43 of a part of the connecting arrangement 1 relative to the web width 25 of the webs 20 to 22 of the element 3.

It is however also possible to replace the individual web parts 39 to 42 and the corrugated layer 10 below with finger-like projections which correspond in their cross sectional dimensions to the individual fields and to connect them to the lower layer 6 or design them in one piece therewith. For example various plastics, pressed papier-mâché, wood etc. can be used as the material.

Figure 28:
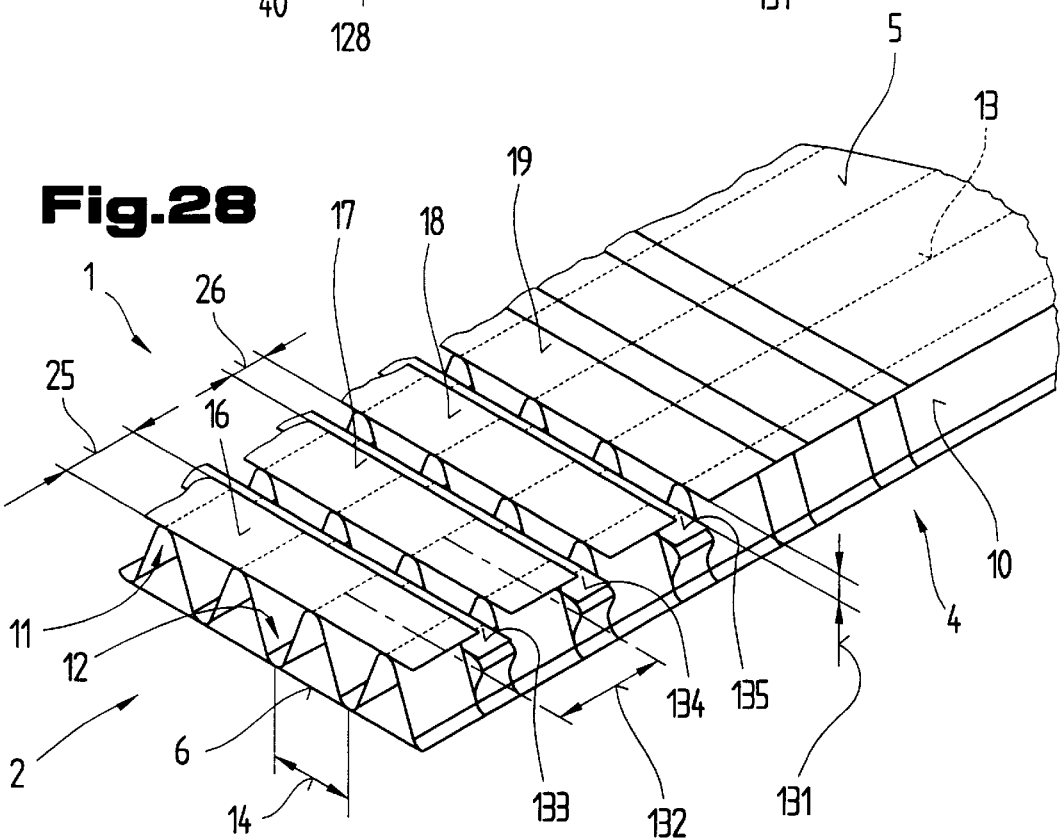
FIG. 28 a further possibility of the embodiment of a connecting arrangement according to the invention in perspective, simplified schematic view.

In FIG. 28 an element 2 is shown with the connecting arrangement 1 according to the invention which serves to connect with an element 3 as described already in FIGS. 20 and 21 and is used to form curved or round components 81, whereby the same reference numbers are used for the same parts as in FIGS. 20 and 21.

Here element 2 comprises corrugated cardboard 4 with an upper and lower layer 5, 6 and a corrugated layer 10 arranged in between with its elevations 11 and depressions 12.

As it is necessary for the curved design of the component 81 to use different spacings 132 and 78 between the elements 2 and 3, according to the embodiment in FIGS. 20 and 21 it is necessary to use different corrugated cardboards 4 depending on the desired curve radius.

Thus in the embodiment according to FIG. 28 for element 2 the upper layer 5 is cut at right angles to the longitudinal extension of the corrugated layer 10 and to its connecting areas 13, whereby webs 16 to 19 are formed with a web width 25 and are arranged relative to one another with the spacing 132. Between the individual webs 16 to 19 individual webs 133 to 135 are formed which have a width 26 between the longitudinal side edges of the webs 16 to 19.

By cutting the upper layer 5 mostly at right angles to the longitudinal extension of the corrugated layer 10 and its connecting regions 13 it is possible, independently of the spacing 14 of the corrugated cardboard 4 to design the necessary spacing 132 of the individual webs 16 to 19 relative to one another corresponding to the spacing 78 in the upper layer 5.

In order to obtain the connecting arrangement 1 according to the invention between the elements 2 and 3 it is necessary, as shown with the intermediate webs 133 to 135, to offset the latter relative to the webs 16 to 19 of the upper layer 5 in the direction of the lower layer 6 with assigned sections of the corrugated layer 10 by the height difference 131, as can be performed for example by pressing down, without removing the latter.

Thus the individual webs 16 to 19 are joined along the connecting regions 13 over the web width 25 to the corrugated layer 10 whereby the individual webs 16 to 19 are secured stably by the corrugated layer 10 to the lower layer 6 of the element 2. Also in this embodiment the individual webs 16 to 19 and the intermediate layers 133 to 135 arranged in between are flat in design.

As already described in FIG. 27 the depth of the cut of the upper layer 5 and the corrugated layer 10 below can be up to the lower layer 6, whereby it must be ensured however that the lower layer 6 remains undamaged in order to ensure a one-sided good holding together of the element 2.

By means of this embodiment it is ensured that to conventionally produced elements 3 with their uniform spacing 78 depending on the desired curve radius the element 2 can be produced independently of the spacing 14 of the corrugated layer 10 with the necessary spacing 132 for the design of a curved component 81. Thus the advantages according to the invention are obtained as described already with reference to FIGS. 20 and 21.

For forms sake it is pointed out that to understand better the construction of the connecting arrangement the latter and its components are partly distorted to and not always to scale and are enlarged in order to improve understanding of the solution according to the invention. Individual features of the combinations of features shown in the individual embodiments can also form an independent solution of the invention.

Mainly the individual embodiments shown in detail in FIGS. 1, 2, 3; 4; 5; 6, 7, 8; 9; 10; 11; 12; 13; 14; 15; 16, 17; 18; 19; 20, 21; 22, 23; 24; 25, 26 can form the subject matter of independent solutions according to the invention. The problems and solutions of the invention relating thereto are to be taken from the detailed descriptions of these Figures.

LIST OF REFERENCE NUMBERS

1 connecting arrangement
2 element
3 element
4 corrugated cardboard
5 layer
6 layer
7 layer
8 layer
9 longitudinal rib
10 corrugated layer
11 elevation
12 depression
13 connecting region
14 spacing
15 construction height
16 web
17 web
18 web
19 web
20 web
21 web
22 web
23 web
24 web
25 web width
26 width
27 machining device
28 cutting device
29 cutting attachment
30 knife
31 bending tool
32 strip
33 cut line
34 cut line
35 press roller
36 web
37 longitudinal rib
38 thickness
39 web part
40 web part
41 web part
42 web part
43 distance
44 length
45 angle
46 web part
47 web part
48 web part
49 recess
50 breadth
51 bending device
52 construction body
53 end region
54 length
55 web width
56 width
57 arrow
58 arrow
59 angle
60 groove angle
61 locking nose
62 perpendicular
63 symmetry axis
64 angle
65 intermediate layer
66 web
67 web
68 web
69 web
70 lower side
71 upper side
72 item
73 connecting region
74 body
75 side part
76 middle part
77 double arrow
78 spacing
79 web width
80 width
81 component
82 cylinder casing
83 radius
84 component
85 indentation
86 wall part 87 wall part
88 web
89 web
90 web
91 machining device
92 carriage
93 guiding device
94 extension
95 guide surface
96 distance
97 holding device
98 holding device
99 double arrow
100 bearing surface
101 angle
102 double arrow
103 arrangement
104 support device
105 shaft
106 cutting device
107 component
108 rib
109 slit
110 cutting attachment
111 extension
112 arrow
113 arrow
114 positioning device
115 pressing device
116 distance
117 cutting edge
118 cutting edge
119 cut edge
120 cut edge
121 cut edge
122 cut edge
123 distance
124 distance
125 cut plane
126 angle
127 web section
128 web section
129 web section
130 web section
131 height difference
132 spacing
133 intermediate web
134 intermediate web
135 intermediate web

We claim:

1. A web-shaped element extending in a longitudinal direction and comprising
   (a) a corrugated layer comprised of several ribs extending in the longitudinal direction, the ribs forming elevations and depressions of the corrugated layer, the elevations and depressions being spaced from each other at equal distances in a direction extending perpendicularly to the longitudinal direction, and the elevations and depressions defining therebetween a height of the corrugated layer, and
   (b) an upper layer comprised of several rectangular, strip-shaped webs defining a common plane,
      (1) the ribs being inclined towards each other and the common plane, and
      (2) a respective one of the rectangular, strip-shaped webs being arranged on each two adjacent ones of the ribs and projecting therefrom on both sides in the perpendicularly extending direction, the rectangular, strip-shaped webs being secured to the elevations of the corrugated layer in connection regions.

2. A web-shaped element extending in a longitudinal direction and comprising
   (a) a lower layer,
   (b) several ribs extending in the longitudinal direction, the ribs forming elevations and being spaced from each other at equal distances in a direction extending perpendicularly to the longitudinal direction,
      (1) the elevations and the lower layer defining therebetween a height of the ribs, and
      (2) the ribs being secured to the lower layer, and
   (c) an upper layer comprised of several rectangular, strip-shaped webs defining a common plane,
      (1) the ribs being inclined towards each other and the common plane, and
      (2) a respective one of the rectangular, strip-shaped webs being arranged on each two adjacent ones of the ribs and projecting therefrom on both sides in the perpendicularly extending direction,
      (3) the rectangular, strip-shaped webs being secured to the elevations of the ribs in connection regions.

3. Web-shaped element according to claim 2, wherein the ribs define a corrugated layer.

4. Web-shaped element according to claim 3, characterized in that an additional lower layer is attached to the depressions of the corrugated layer.

5. Web-shaped element according to claim 1, characterized in that an intermediate web positioned between two adjacent webs arranged spaced apart perpendicular to the longitudinal ribs is arranged off-set in height in the direction of the lower layer.

6. Web-shaped element according to claim 1, characterized in that the lower layer is formed from at least several strip-shaped webs with a rectangular cross section, which run parallel to one another on the depressions with their flat sides in a common plane and are arranged at right angles to the longitudinal ribs with equal spacing.

7. Web-shaped element according to claim 1, characterized in that the webs of the upper and lower layer are offset by a half spacing between the longitudinal axes of the webs at right angles to the longitudinal axes of the webs.

8. Web-shaped element according to claim 1, characterized in that the longitudinal side edges of the webs are immediately adjacent to one another.

9. Web-shaped element according to claim 1, characterized in that a web width at right angles to the longitudinal direction of the longitudinal ribs is smaller than a spacing between the longitudinal ribs and elevations.

10. Web-shaped element according to claim 3, characterized in that on the side of the longitudinal ribs facing away from the upper layer an intermediate layer formed by a continuous layer is arranged, and in that on a bearing surface of this intermediate layer averted from the depressions of the corrugated layer a corrugated layer is also arranged.

11. Web-shaped element according to claim 10, characterized in that the longitudinal ribs arranged on the two bearing surfaces of the intermediate layer are arranged offset by a half spacing relative to the spacing between the longitudinal ribs assigned to the upper layer.

12. Web-shaped element according to claim 4, characterized in that the lower layer is formed by a continuous layer made of cardboard, paper, plastic, or a combination thereof.

13. Web-shaped element according to claim 4, characterized in that the lower layer is made of a continuous flat bend-resistant panel made of wood, hard fiber, or sheet metal.

14. Web-shaped element according to claim 10, characterized in that the spacing between the elevations and depressions of the corrugated layer is different in size on the opposite bearing surfaces of the intermediate layer.

15. Web-shaped element according to claim 10, characterized in that the longitudinal direction of the longitudinal ribs run perpendicular to one another on the two bearing surfaces of the intermediate layer.

16. Web-shaped element according to claim 10, characterized in that several corrugated layers are secured in the longitudinal direction of the longitudinal ribs at a distance behind one another on a continuous layer of the lower layer or an intermediate layer, and in that web parts project on the individual longitudinal ribs at right angles to the longitudinal direction.

17. Web-shaped element according to claim 16, characterized in that two corrugated layers arranged in the longitudinal direction are separated from one another by cross channels.

18. Web-shaped element according to claim 17, characterized in that a distance corresponding to a width of the cross channels is equal to or greater than the length of the web parts.

19. Web-shaped element according to claim 1, characterized in that the longitudinal side edges of the webs in the longitudinal direction of the longitudinal ribs are conical or arrow-shaped relative to one another.

20. Web-shaped element according to claim 1, characterized in that the longitudinal side edges of the webs are provided with projecting locking noses or teeth whereby a flange of the teeth is aligned perpendicular to the longitudinal axis of the longitudinal ribs.

21. Web-shaped element according to claim 1, characterized in that a cross sectional shape of the webs is C-shaped perpendicular to the longitudinal direction of the longitudinal ribs.

22. Web-shaped element made of corrugated cardboard with a corrugated layer made of paper or cardboard and an upper layer made of paper or cardboard secured by a layer of glue onto elevations of the corrugated layer and a lower layer or intermediate layer made of paper or cardboard also secured by a layer of glue onto depressions of the corrugated layer opposite said elevations, characterized in that at least the upper layer is cut in the region of the depressions lying between the elevations, or the upper layer is formed by webs on the elevations running in their longitudinal direction, which are arranged spaced apart from one another at right angles to their longitudinal direction.

23. Web-shaped element according to claim 22, characterized in that the webs are permanently deformed convexly to have a C-shaped cross section, by the influence of temperature or pressure or moisture, or a combination thereof.

24. Connecting arrangement between a first web-shaped element with an upper layer and a lower layer spaced apart therefrom in height and several longitudinal ribs arranged perpendicular thereto and between the latter with equal spacing and aligned parallel relative to one another, the upper layer being formed from several strip-shaped webs or web parts with a rectangular cross section which run parallel to one another on the longitudinal ribs and lie with their flat sides in a common plane and project on both sides over the longitudinal ribs at right angles to their longitudinal extension and a second web-shaped element, characterized in that the second web-shaped element is made of plastic or wood, and for mounting the webs or web parts, is provided with grooved recesses arranged with the same spacing extending parallel to the longitudinal direction of the longitudinal ribs, and the recesses are designed to be U- or C-shaped in a plane perpendicular to the longitudinal direction thereof, and in that a width of the recesses is equal to or smaller than the web width of the webs or web parts.

25. Connecting arrangement between two web-shaped elements with respectively several longitudinal ribs extending in a longitudinal direction, whereby on elevations thereof at least several rectangular, strip-shaped webs or web parts of an upper layer are arranged with their flat sides in a common plane, and the latter project on both sides respectively over the longitudinal ribs at right angles to their longitudinal extension and two immediately adjacent webs or web parts at right angles to their longitudinal extension are spaced apart from one another and arranged with equal spacing from one another, characterized in that with the first or second web-shaped element, the longitudinal ribs in cross section are inclined towards the upper layer and to one another and form a corrugated layer with elevations and depressions, and in that on two longitudinal ribs forming the corrugated layer a strip-shaped web or web part is arranged and the webs or web parts are secured onto the elevations of the corrugated layer in connecting regions and the elevations and depressions are arranged spaced apart from one another in height, and in that the projection projecting over the connecting region forms a linking part of the connecting arrangement, the linking parts of the first element engaging behind the linking parts of the additional element on the side facing the lower layer or the intermediate layer or the corrugated layer.

26. Connecting arrangement according to claim 25, characterized in that the longitudinal axes of the webs of the upper and the lower layer are arranged offset by a half spacing relative to one another perpendicular to their longitudinal extension.

27. Connecting arrangement according to claim 25, characterized in that the projections of the webs or web parts are designed to be elastically deformable in a perpendicular direction to the layer forming them.

28. Connecting arrangement according to claim 24, characterized in that one element is made out of plastic or wood, and to mount the webs or web parts is provided with grooved recesses arranged in the same spacing extending parallel to the longitudinal direction of the longitudinal webs or longitudinal ribs.

29. Connecting arrangement according to claim 28, characterized in that the recesses are U- or C-shaped in a plane running perpendicular to the longitudinal direction thereof, and in that a width of the recesses is equal to or smaller than the web width of the webs or web parts.

30. Connecting arrangement according to claim 24, characterized in that the webs or web parts are planar, or deformed concavely relative to the longitudinal ribs or the corrugated layer.

31. Method for producing a web-shaped element in which a layer of plastic or paper or cardboard is applied onto a corrugated layer formed by parallel longitudinal ribs arranged on a lower layer and is glued thereon by an adhesive, characterized in that the longitudinal ribs are arranged inclined towards an upper layer to form the corrugated layer with elevations and depressions, and in that, once the glue has set, at least the upper layer is cut or partly removed in a direction parallel to the longitudinal ribs or the elevations or depressions and between said longitudinal ribs or elevations or depressions so that facing longitudinal side edges of webs or web parts are separated from one another and spaced apart.

* * * * *